US012593074B2

(12) United States Patent
Yang et al.

(10) Patent No.: US 12,593,074 B2
(45) Date of Patent: Mar. 31, 2026

(54) SYSTEMS AND METHODS OF BUFFERING IMAGE DATA BETWEEN A PIXEL PROCESSOR AND AN ENTROPY CODER

(71) Applicant: QUALCOMM Incorporated, San Diego, CA (US)

(72) Inventors: Shengqi Yang, Carlsbad, CA (US); Haifeng Xu, San Diego, CA (US); Sean Ni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/668,536

(22) Filed: May 20, 2024

(65) Prior Publication Data

US 2025/0358455 A1    Nov. 20, 2025

(51) Int. Cl.
*H04N 19/91* (2014.01)

(52) U.S. Cl.
CPC ..................................... *H04N 19/91* (2014.11)

(58) Field of Classification Search
CPC ....................................................... H04N 19/91
See application file for complete search history.

(56) References Cited

U.S. PATENT DOCUMENTS

| | | |
|---|---|---|
| 5,684,534 A | 11/1997 | Harney et al. |
| 5,771,331 A | 6/1998 | Aoki et al. |

| | | | | |
|---|---|---|---|---|
| 7,042,948 B2 | 5/2006 | Kim et al. | | |
| 8,355,447 B2 | 1/2013 | Zhao et al. | | |
| 10,506,283 B2 | 12/2019 | Gu | | |
| 2013/0208165 A1 | 8/2013 | An et al. | | |
| 2015/0138406 A1* | 5/2015 | Sokeila | ................... | H04N 23/45 |
| | | | | 348/262 |
| 2017/0105004 A1 | 4/2017 | Chen et al. | | |
| 2017/0346762 A1* | 11/2017 | Lapidous | .................. | H04L 1/16 |
| 2019/0297320 A1* | 9/2019 | Yamamoto | ............. | H04N 19/14 |
| 2024/0233238 A1* | 7/2024 | Liktor | ................... | G06T 15/005 |

FOREIGN PATENT DOCUMENTS

CN    113613058 A    11/2021

OTHER PUBLICATIONS

International Search Report and Written Opinion—PCT/US2025/027424—ISA/EPO—Jul. 24, 2025.

* cited by examiner

*Primary Examiner* — Nasim N Nirjhar
(74) *Attorney, Agent, or Firm* — Moore Intellectual Property Law, PLLC

(57) ABSTRACT

A device includes a ring buffer. The device also includes an entropy encoder coupled to the ring buffer and configured to retrieve, from the ring buffer, first image data of a first image frame of a sequence of image frames. The entropy encoder is also configured to encode the first image data to generate first bitstream data. The device also includes a pixel processor coupled to the ring buffer and configured to process a second image frame of the sequence of image frames to generate second image data. The pixel processor is also configured to store the second image data in the ring buffer.

20 Claims, 12 Drawing Sheets

500

600

700

120

702

120

590

220

800

802

120

590

804

806

900

920

120

902

Display 220

Processor(s) 590

Speaker 904

1000

CAMERA

1002

1020

590

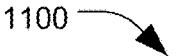
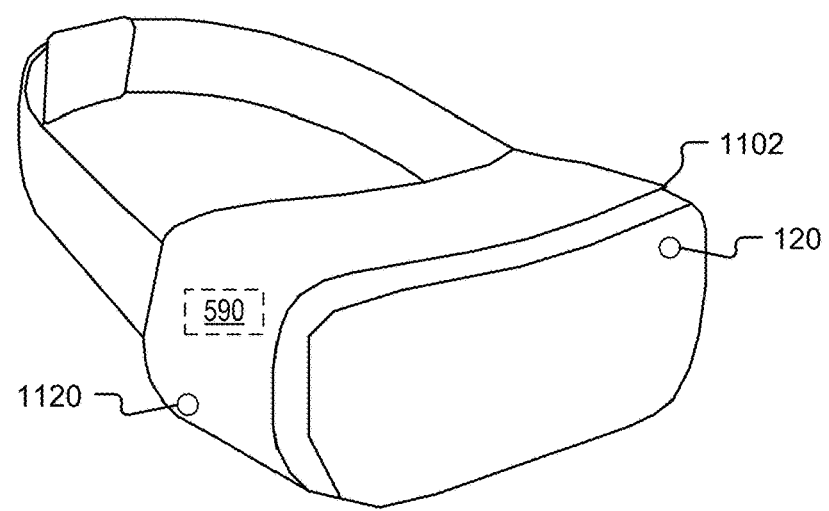
FIG. 11
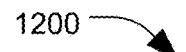
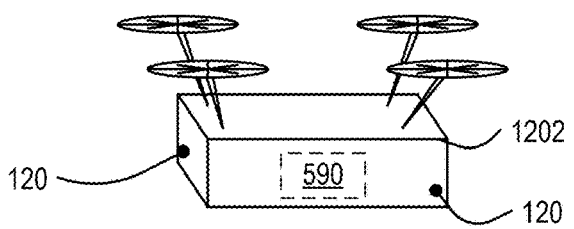
FIG. 12

1400

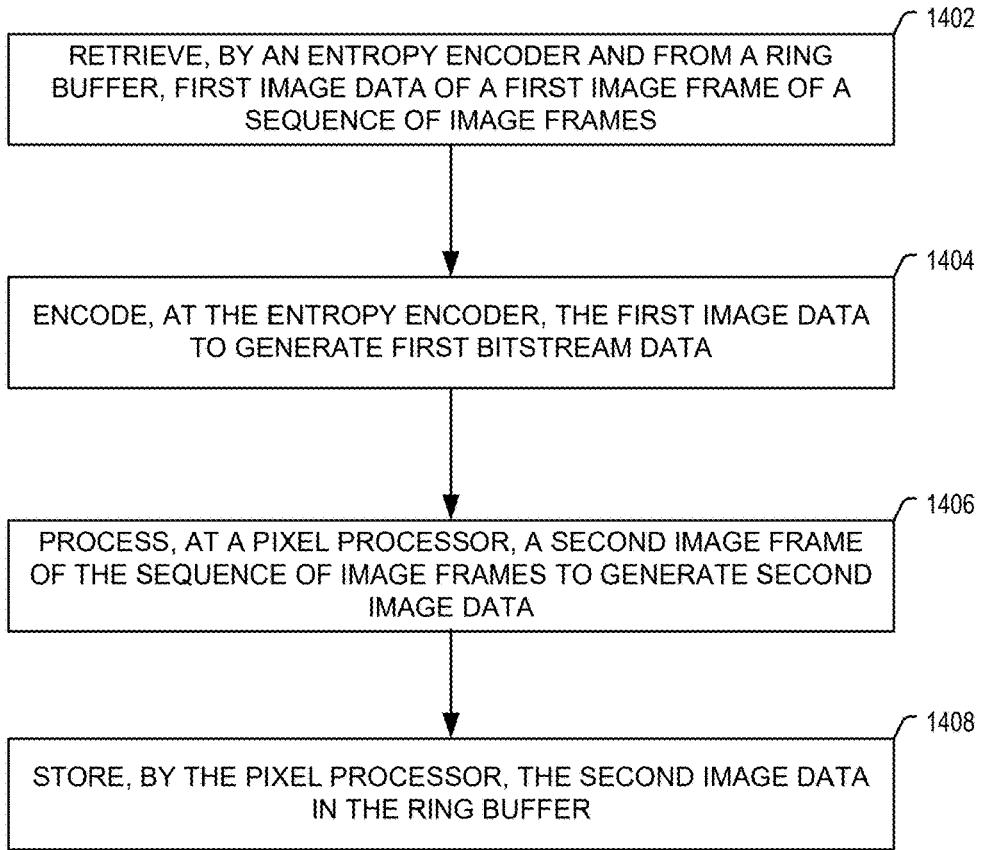

1402

RETRIEVE, BY AN ENTROPY ENCODER AND FROM A RING BUFFER, FIRST IMAGE DATA OF A FIRST IMAGE FRAME OF A SEQUENCE OF IMAGE FRAMES

1404

ENCODE, AT THE ENTROPY ENCODER, THE FIRST IMAGE DATA TO GENERATE FIRST BITSTREAM DATA

1406

PROCESS, AT A PIXEL PROCESSOR, A SECOND IMAGE FRAME OF THE SEQUENCE OF IMAGE FRAMES TO GENERATE SECOND IMAGE DATA

1408

STORE, BY THE PIXEL PROCESSOR, THE SECOND IMAGE DATA IN THE RING BUFFER

*FIG. 14*

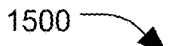

1500

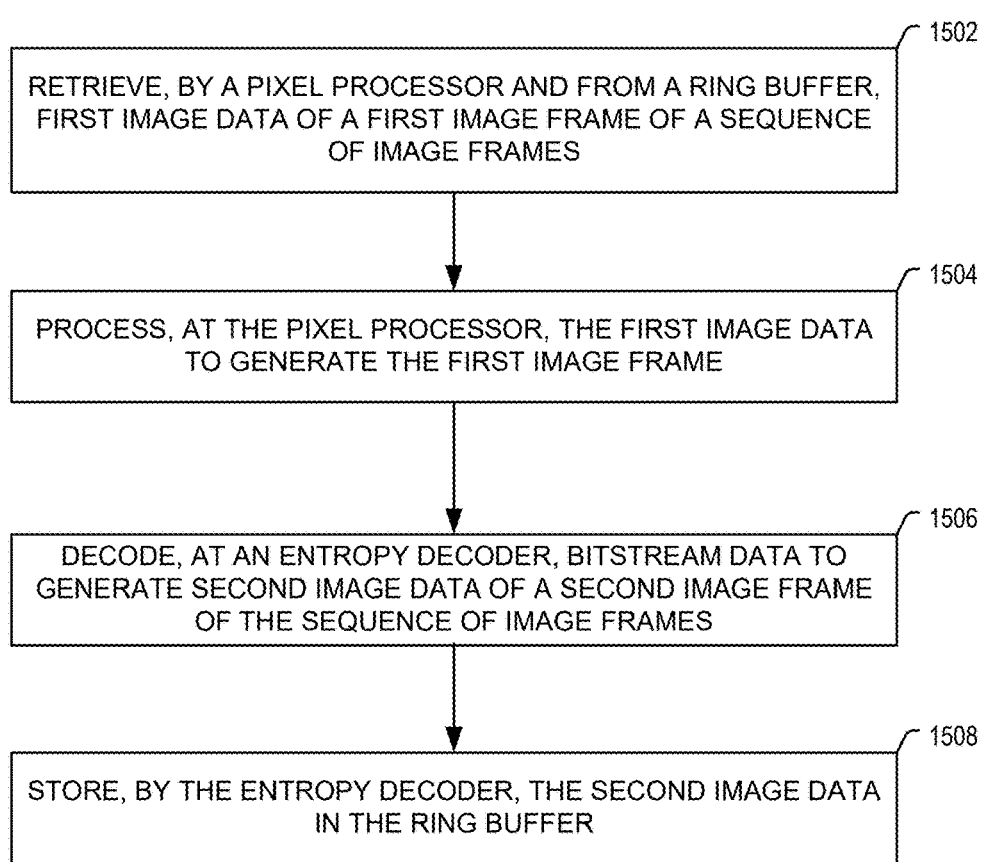

┌─ 1502

RETRIEVE, BY A PIXEL PROCESSOR AND FROM A RING BUFFER, FIRST IMAGE DATA OF A FIRST IMAGE FRAME OF A SEQUENCE OF IMAGE FRAMES

┌─ 1504

PROCESS, AT THE PIXEL PROCESSOR, THE FIRST IMAGE DATA TO GENERATE THE FIRST IMAGE FRAME

┌─ 1506

DECODE, AT AN ENTROPY DECODER, BITSTREAM DATA TO GENERATE SECOND IMAGE DATA OF A SECOND IMAGE FRAME OF THE SEQUENCE OF IMAGE FRAMES

┌─ 1508

STORE, BY THE ENTROPY DECODER, THE SECOND IMAGE DATA IN THE RING BUFFER

FIG. 15

SYSTEMS AND METHODS OF BUFFERING IMAGE DATA BETWEEN A PIXEL PROCESSOR AND AN ENTROPY CODER

I. FIELD

The present disclosure is generally related to image coding.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive a video signal from a video camera. For example, the video signal may represent a sequence of image frames. A pixel processor processes an input image frame to generate image data that is processed by an entropy encoder to generate bitstream data. The bitstream data can be transmitted to another device. An entropy decoder decodes the bitstream data to generate image data that is processed by a pixel processor to generate an output image frame. The output image frame is a reproduction of the input image frame. Processing of an image frame by a pixel processor can take a different duration than processing of image data by an entropy coder. Buffering image data between a pixel processor and an entropy coder can enable decoupling of the processing speeds of the pixel processor and the entropy coder.

III. SUMMARY

According to one implementation of the present disclosure, a device includes a ring buffer. The device also includes an entropy encoder coupled to the ring buffer and configured to retrieve, from the ring buffer, first image data of a first image frame of a sequence of image frames. The entropy encoder is also configured to encode the first image data to generate first bitstream data. The device also includes a pixel processor coupled to the ring buffer and configured to process a second image frame of the sequence of image frames to generate second image data. The pixel processor is also configured to store the second image data in the ring buffer.

According to another implementation of the present disclosure, a method includes retrieving, by an entropy encoder and from a ring buffer, first image data of a first image frame of a sequence of image frames. The method also includes encoding, at the entropy encoder, the first image data to generate first bitstream data. The method further includes processing, at a pixel processor, a second image frame of the sequence of image frames to generate second image data. The method also includes storing, by the pixel processor, the second image data in the ring buffer.

According to another implementation of the present disclosure, a non-transitory computer-readable medium stores instructions that, when executed by a processor, cause the processor to retrieve, from a ring buffer, first image data of a first image frame of a sequence of image frames. The instructions, when executed by the processor, also cause the processor to encode the first image data at an entropy encoder to generate first bitstream data. The instructions, when executed by the processor, further cause the processor to process a second image frame of the sequence of image frames at a pixel processor to generate second image data. The instructions, when executed by the processor, also cause the processor to store the second image data in the ring buffer.

According to another implementation of the present disclosure, an apparatus includes means for retrieving, from a ring buffer, first image data of a first image frame of a sequence of image frames. The apparatus also includes means for encoding the first image data at an entropy encoder to generate first bitstream data. The apparatus further includes means for processing a second image frame of the sequence of image frames at a pixel processor to generate second image data. The apparatus also includes means for storing the second image data in the ring buffer.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 11 is a diagram of a headset, such as a virtual reality, mixed reality, or augmented reality headset, operable to buffer image data between a pixel processor and an entropy coder, in accordance with some examples of the present disclosure.

FIG. 12 is a diagram of a first example of a vehicle operable to buffer image data between a pixel processor and an entropy coder, in accordance with some examples of the present disclosure.

FIG. 14 is a diagram of a particular implementation of a method of buffering image data between a pixel processor and an entropy encoder that may be performed by the device of FIG. 1, in accordance with some examples of the present disclosure.

FIG. 15 is a diagram of a particular implementation of a method of buffering image data between an entropy decoder and a pixel processor that may be performed by the device of FIG. 2, in accordance with some examples of the present disclosure.

V. DETAILED DESCRIPTION

Figure 1:
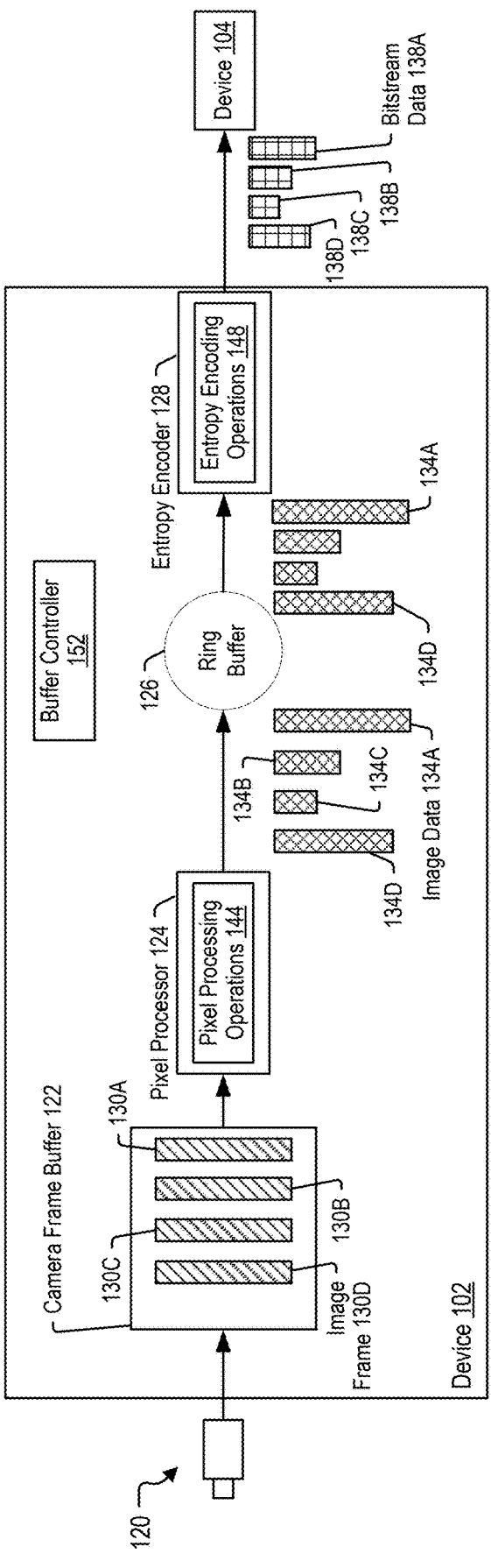
FIG. 1 is a block diagram of a particular illustrative aspect of a system operable to buffer image data between a pixel processor and an entropy encoder, in accordance with some examples of the present disclosure.

Computing devices often incorporate functionality to receive a sequence of image frames from a video camera. The video camera stores image frames in a camera frame buffer for retrieval by a pixel processor. The pixel processor retrieves a first image frame from the camera frame buffer, processes the first image frame to generate first image data, and provides the first image data to an entropy encoder. The entropy encoder encodes the first image data to generate first bitstream data.

Typically, the pixel processor writes image data to a ping-pong buffer for retrieval by the entropy encoder. The ping-pong buffer includes two slots, each of the two slots is of a fixed size that can accommodate a largest image data size of an image frame. In an example, image data corresponding to an intra-frame (I-frame) has a larger size than image data corresponding to a predicted frame (P-frame), which in turn has a larger size than image data corresponding to a bi-directional frame (B-frame). In this example, the slot size in a ping-pong buffer is at least the size of image data corresponding to an I-frame.

In an example, the pixel processor stores the first image data in a first slot of the ping-pong buffer. The pixel processor processes a second image frame to generate second image data and stores the second image data in the second slot while the first image data is available in the first slot for the entropy encoder to read and process. The pixel processor processes a third image frame to generate third image data. If the entropy encoder has not finished with the first image data and has not marked the first slot as available, the pixel processor cannot store the third image data in the first slot of the ping-pong buffer. If the ping-pong buffer is unavailable, the pixel processor cannot keep processing image frames from the camera frame buffer. If the camera frame buffer gets full, image frames from the video camera are dropped, leading to fewer image frames that are encoded and reduced video reproduction quality. When image data is stored in a ping-pong buffer slot, the slot is usually not fully occupied because most frame image data (e.g., for B-frames and P-frames) is smaller than largest frame image data (e.g., for I-frames). The ping-pong buffer may thus have unoccupied space even though no slots are available.

Systems and methods of buffering image data between a pixel processor and an entropy coder are disclosed. For example, a device includes a ring buffer coupled to a pixel processor and to an entropy encoder. The pixel processor retrieves a first image frame from a camera frame buffer, processes the first image frame to generate first image data, and stores the first image data in the ring buffer. The first image data is available in the ring buffer for the entropy encoder to read and process to generate first bitstream data. The pixel processor processes a second image frame to generate second image data and stores the second image data subsequent to the first image data in the ring buffer. The pixel processor processes a third image frame to generate third image data and stores the third image data subsequent to the second image data in the ring buffer. Because space in the ring buffer is allocated based on size of the image data instead of fixed-size slots, any unoccupied space in the ring buffer is available to store image data. Buffering the data between the pixel processor and the entropy encoder enables decoupling of the processing speeds of the pixel processor and the entropy encoder.

Similarly, a device can include a ring buffer coupled to a pixel processor and to an entropy decoder. The entropy decoder processes first bitstream data to generate first image data and stores the first image data in the ring buffer. The first image data is available in the ring buffer for the pixel processor to read and process to generate a first image frame. The entropy decoder processes second bitstream data to generate second image data and stores the second image data subsequent to the first image data in the ring buffer. The entropy decoder processes third bitstream data to generate third image data and stores the third image data subsequent to the second image data in the ring buffer. Because space in the ring buffer is allocated based on size of the image data instead of fixed-size slots, any unoccupied space in the ring buffer is available to store image data. Buffering the data between the pixel processor and the entropy decoder enables decoupling of the processing speeds of the pixel processor and the entropy decoder.

Figure 5:
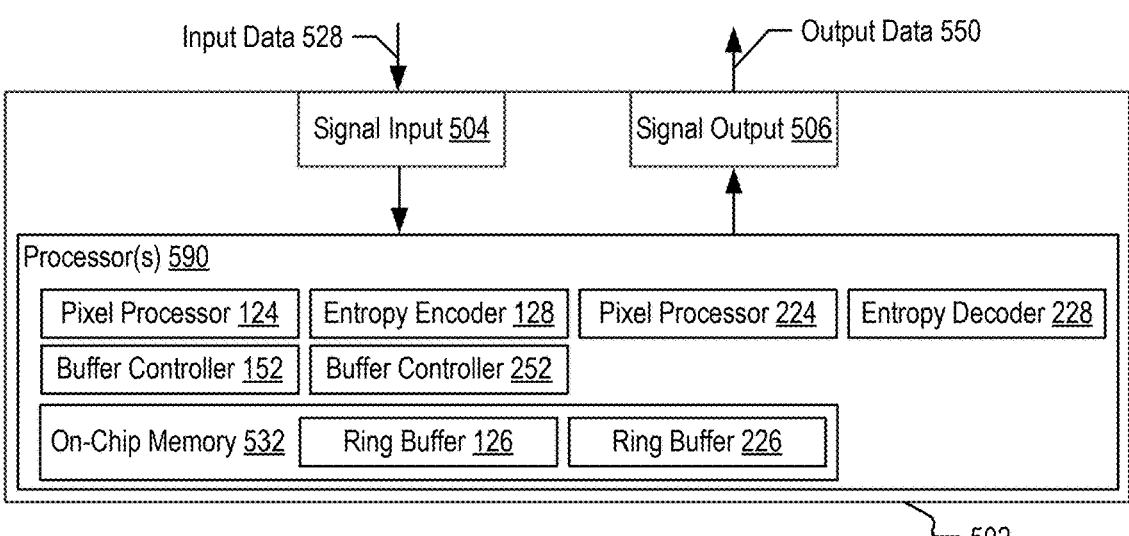
FIG. 5 illustrates an example of an integrated circuit operable to buffer image data between a pixel processor and an entropy coder, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 5 depicts an integrated circuit 502 including one or more processors ("processor(s) 590 of FIG. 5), which indicates that in some implementations the integrated circuit 502 includes a single processor 590 and in other implementations the integrated circuit 502 includes multiple processors 590. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple image frames are illustrated and associated with reference numbers 130A, 130B, 130C, and 130D. When referring to a particular one of these image frames, such as an image frame 130A, the distinguishing letter "A" is used. However, when referring to any arbitrary one of these image frames or to these image frames as a group, the reference number 130 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/ or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect is shown of a system 100 that is configured to buffer image data between a pixel processor and an entropy encoder. The system 100 includes a device 102 that is coupled to a camera 120 (e.g., an image sensor, a video camera, or both), and a device 104.

The camera 120 is illustrated as external to the device 102 as an illustrative example, in other examples the camera 120 can be integrated in the device 102. In some aspects, the device 102 is configured to be coupled via a network (e.g., a wired network, a wireless network, or both) to the device 104.

The device 102 includes a camera frame buffer 122 coupled to a pixel processor 124 and the pixel processor 124 is coupled to a ring buffer 126. In some embodiments, the pixel processor 124 includes at least one of a prediction engine, a transform engine, or a filter engine. The pixel processor 124 is configured to retrieve an image frame 130 from the camera frame buffer 122, to process the image frame 130 to generate image data 134, and to store the image data 134 in the ring buffer 126. The device 102 also includes an entropy encoder 128 coupled to the ring buffer 126. The entropy encoder 128 is configured to retrieve the image data 134 from the ring buffer 126 and to process the image data 134 to generate bitstream data 138.

The device 102 includes a buffer controller 152 configured to manage the ring buffer 126. Optionally, in some implementations, the buffer controller 152 is configured to manage writes to and reads from the ring buffer 126, as further described with reference to FIG. 3. Optionally, in some embodiments, the buffer controller 152 is configured to dynamically resize the ring buffer 126 based on a detected condition of a sequence of image frames retrieved from the camera frame buffer 122, as further described with reference to FIG. 4. Optionally, in some embodiments, the device 102 includes a system-on-chip that includes on-chip memory, the pixel processor 124, and the entropy encoder 128, and the on-chip memory includes the ring buffer 126. In some aspects, resizing the ring buffer 126 corresponds to adjusting a size allocation of the ring buffer 126 in the on-chip memory. For example, one or more other portions of the on-chip memory can be allocated to other uses, one or more other portions of the on-chip memory can remain unallocated, or a combination thereof.

In some implementations, the device 102 corresponds to or is included in one of various types of devices. In an illustrative example, the device 102 corresponds to or is included in at least one of a mobile phone or a tablet computer device, as described with reference to FIG. 6, a wearable electronic device, as described with reference to FIG. 7, augmented reality or mixed reality glasses, as described with reference to FIG. 8, a voice-controlled speaker system, as described with reference to FIG. 9, a camera device, as described with reference to FIG. 10, or a virtual reality, mixed reality, or augmented reality headset, as described with reference to FIG. 11. In another illustrative example, the device 102 corresponds to or is included in a vehicle that also includes the camera 120, such as described further with reference to FIG. 12 and FIG. 13.

During operation, the camera 120 stores a sequence of image frames 130 in the camera frame buffer 122. For example, the camera 120 provides image frames 130 (e.g., an image frame 130A, an image frame 130B, an image frame 130C, an image frame 130D, one or more additional image frames, or a combination thereof) to the camera frame buffer 122 at a fixed rate (e.g., 30 image frames per second). In some aspects, the rate at which the camera 120 provides image frames 130 is based on a configuration setting, default data, a user input, or a combination thereof.

The pixel processor 124 obtains one image frame 130 (e.g., a YUV image frame or a RGB image frame) at a time from the camera frame buffer 122, and performs pixel processing operations 144 (e.g., prediction, transformation, filtering, compression, etc.) on the image frame 130 to generate image data 134 (e.g., data indicating syntax information).

When there is space available in the ring buffer 126, the pixel processor 124 stores the image data 134 in the ring buffer 126, as further described with reference to FIG. 3, and obtains a next image frame from the camera frame buffer 122 to process. For example, the pixel processor 124 performs pixel processing operations 144 on the image frame 130A to generate image data 134A, and stores the image data 134A in the ring buffer 126 when space is available in the ring buffer 126. After storing the image data 134A in the ring buffer 126, the pixel processor 124 obtains the image frame 130B from the camera frame buffer 122, performs pixel processing operations 144 on the image frame 130B to generate image data 134B, and stores the image data 134B in the ring buffer 126 when space is available in the ring buffer 126. Similarly, after storing the image data 134B in the ring buffer 126, the pixel processor 124 obtains the image frame 130C from the camera frame buffer 122, performs pixel processing operations 144 on the image frame 130C to generate image data 134C, and stores the image data 134C in the ring buffer 126 when space is available in the ring buffer 126. To illustrate, the pixel processor 124 can store the image data 134C in the ring buffer 126 prior to the entropy encoder 128 retrieving the image data 134A, the image data 134B, or both, from the ring buffer 126. For example, unlike a ping-pong buffer, the ring buffer 126 can be used to store image data corresponding to more than two image frames at a given time.

Optionally, in some embodiments, the pixel processor 124 generates image data 134 of an image frame 130 corresponding to an I-frame, a P-frame, or a B-frame. In some examples, each of the image frames 130 is of the same size. However, the image data 134 can be of different sizes. For example, image data 134A corresponding to an I-frame can have a first size that is greater than a second size of image data 134B corresponding to a P-frame, and the second size of the image data 134B can be greater than a third size of image data 134C corresponding to a B-frame. In a particular aspect, image data corresponding to the same type of image frames can have different sizes. For example, image data 134D representing the image frame 130D can correspond to an I-frame having a fourth size that is less than the first size of the image data 134A.

The ring buffer 126 does not have predetermined slot sizes. In an example, a write pointer indicates a beginning of a next slot to write to and the pixel processor 124, subsequent to writing the image data 134A in the ring buffer 126, advances the write pointer to an end of the of image data 134A. For example, the write pointer is advanced to indicate a location that is after the image data 134A in the ring buffer 126. Later, the pixel processor 124 writes the image data 134B starting at the location indicated by the write pointer and advances the write pointer to indicate a location that is after the image data 134B.

The entropy encoder 128 obtains image data 134 of one frame at a time from the ring buffer 126, as further described with reference to FIG. 3, and performs entropy encoding operations 148 on the image data 134 to generate bitstream data 138 (e.g., syntax data, coefficient data, header data, or a combination thereof). For example, the entropy encoder 128 performs entropy encoding operations 148 on the image data 134A to generate bitstream data 138A. In a particular aspect, the bitstream data 138 has a smaller size than the corresponding image data 134. For example, the bitstream data 138A is smaller (e.g., is represented by fewer bits) than the image data 134A.

After generating the bitstream data 138A, the entropy encoder 128 obtains the image data 134B from the ring buffer 126 and performs entropy encoding operations 148 on the image data 134B to generate bitstream data 138B. Because the ring buffer 126 does not have predetermined slot sizes, a read pointer indicates a beginning of a next slot to read from. For example, the entropy encoder 128 reads the image data 134A from a location indicated by the read pointer, and after reading the image data 134A advances the read pointer to indicate a location after the image data 134A. Later, the entropy encoder 128 reads the image data 134B from the location indicated by the read pointer and advances the read pointer to indicate a location after the image data 134B. Similarly, the entropy encoder 128 processes image data 134C and image data 134D to generate bitstream data 138C and bitstream data 138D, respectively. Optionally, in some embodiments, the device 102 provides (e.g., transmits) the bitstream data 138 to the device 104.

The system 100 thus enables the pixel processor 124 and the entropy encoder 128 to operate asynchronously and exchange image data via the ring buffer 126. Hence, the processing speeds of the pixel processor 124 and the entropy encoder 128 can be decoupled. The system 100 also improves efficiency by enabling any unoccupied space in the ring buffer 126 to be available to store image data because the ring buffer 126 does not have fixed size slots.

Figure 2:
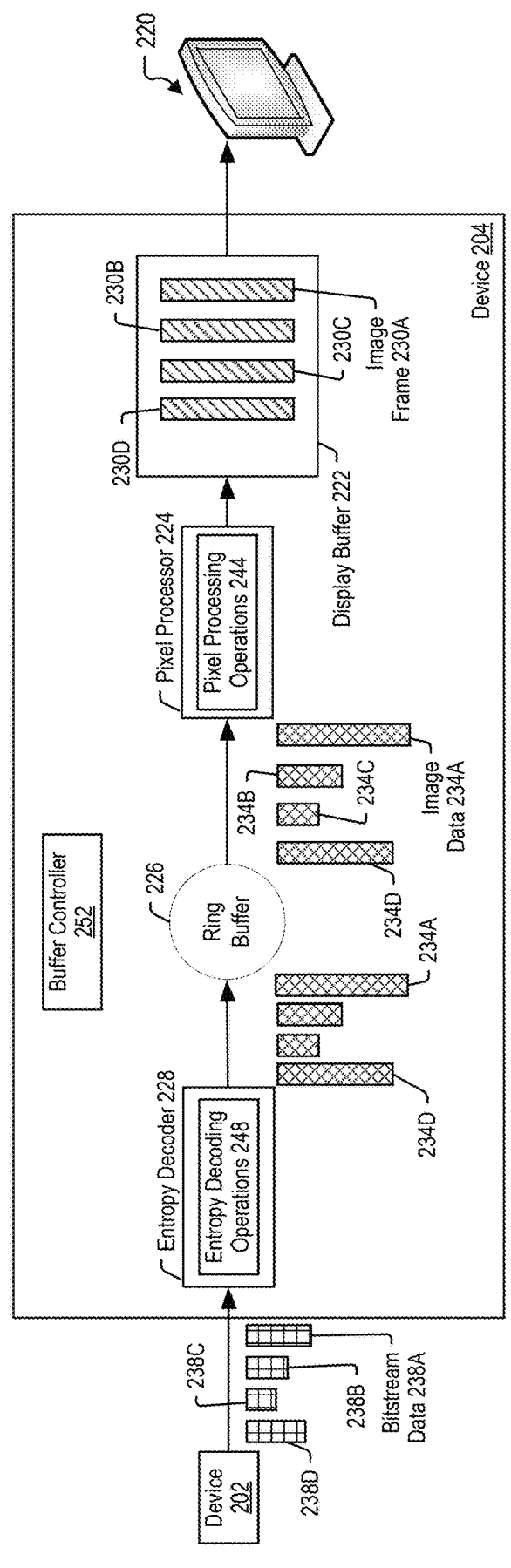
FIG. 2 is a diagram of an illustrative aspect of a system operable to buffer image data between an entropy decoder and a pixel processor, in accordance with some examples of the present disclosure.

Referring to FIG. 2, a particular illustrative aspect is shown of a system 200 that is configured to buffer image data between an entropy decoder and a pixel processor. The system 200 includes a device 204 configured to be coupled via a network (e.g., a wired network, a wireless network, or both) to a device 202.

In some embodiments, the device 202 and the device 204 correspond to the device 102 and the device 104 of FIG. 1, respectively. For example, the device 102 (e.g., the device 202) is a dedicated transmitting device and the device 104 (e.g., the device 204) is a dedicated receiving device of bitstream data 138 (e.g., bitstream data 238). In some other embodiments, the device 102 of FIG. 1 can be a receiving device for one bitstream and a transmitting device for another bitstream. For example, the device 102 can be a transmitting device of bitstream data 138 to the device 104, as described with reference to FIG. 1; additionally, the device 102 can include one or more components of the device 204 and be a receiving device of bitstream data 238 from the device 202. In some aspects, the device 102 transmits the bitstream data 138 to the same device from which the device 102 receives the bitstream data 238. In these aspects, the device 202 corresponds to the device 104. In some aspects, the device 102 transmits the bitstream data 138 to one device and receives the bitstream data 238 from another device. In these aspects, the device 202 is distinct from the device 104.

The device 204 includes an entropy decoder 228 coupled to a ring buffer 226. The entropy decoder 228 is configured to process bitstream data 238 to generate image data 234 and to store the image data 234 in the ring buffer 226. The device 204 also includes a pixel processor 224 coupled to the ring buffer 226. The pixel processor 224 is configured to retrieve image data 234 from the ring buffer 226 and to process the image data 234 to generate an image frame 230. In embodiments in which the bitstream data 238 corresponds to the bitstream data 138 of FIG. 1, the image frame 230 corresponds to a reproduction of an image frame 130.

Optionally, in some embodiments, the pixel processor 224 is coupled, via a display buffer 222, to a display 220. The display 220 is shown as external to the device 204 as an illustrative example, in other examples the display 220 is integrated in the device 204. The pixel processor 224 stores the image frame 230 in the display buffer 222 to be played out on the display 220.

The device 204 includes a buffer controller 252 configured to manage the ring buffer 226. Optionally, in some implementations, the buffer controller 252 is configured to manage writes to and reads from the ring buffer 226, as further described with reference to FIG. 3. Optionally, in some embodiments, the buffer controller 252 is configured to dynamically resize the ring buffer 226 based on a detected condition of a sequence of image frames, as further described with reference to FIG. 4. Optionally, in some embodiments, the device 204 includes a system-on-chip that includes on-chip memory, the pixel processor 224, and the entropy decoder 228, and the on-chip memory includes the ring buffer 226. In some aspects, resizing the ring buffer 226 corresponds to adjusting a size allocation of the ring buffer 226 in the on-chip memory. For example, one or more other portions of the on-chip memory can be allocated to other uses, one or more other portions of the on-chip memory can remain unallocated, or a combination thereof.

In some implementations, the device 204 corresponds to or is included in one of various types of devices. In an illustrative example, the device 204 corresponds to or is included in at least one of a mobile phone or a tablet computer device, as described with reference to FIG. 6, a wearable electronic device, as described with reference to FIG. 7, augmented reality or mixed reality glasses, as described with reference to FIG. 8, a voice-controlled speaker system, as described with reference to FIG. 9, a camera device, as described with reference to FIG. 10, or a virtual reality, mixed reality, or augmented reality headset, as described with reference to FIG. 11. In another illustrative example, the device 204 corresponds to or is included in a vehicle that also includes the camera 120, such as described further with reference to FIG. 12 and FIG. 13.

During operation, the device 204 receives bitstream data 238 from the device 202. In some embodiments, the bitstream data 238 is stored in a jitter buffer (not shown) for retrieval by the entropy decoder 228. For example, the device 204 receives bitstream data 238A, bitstream data 238B, bitstream data 238C, and bitstream data 238D at various times.

The entropy decoder 228 retrieves the bitstream data 238 corresponding to one image frame at a time and performs entropy decoding operations 248 (e.g., reconstruction, prediction, transform, filtering, etc.) to generate image data 234 (e.g., data indicating syntax information, macroblock header and coefficients, etc.) representing the image frame. When there is space available in the ring buffer 226, the entropy decoder 228 stores the image data 134 in the ring buffer 226, as further described with reference to FIG. 3, and obtains bitstream data corresponding to a next image frame to process when available. For example, the entropy decoder 228 retrieves bitstream data 238A (e.g., from a jitter buffer), performs entropy decoding operations 248 on the bitstream data 238A to generate image data 234A, and stores the image data 234A in the ring buffer 226 when space is available in the ring buffer 226. After storing the image data 234A in the ring buffer 226, the entropy decoder 228 retrieves the bitstream data 238B (e.g., from a jitter buffer), performs entropy decoding operations 248 on the bitstream data 238B to generate image data 234B, and stores the image data 234B in the ring buffer 226 when space is available in the ring buffer 226.

Similarly, after storing the image data 234B in the ring buffer 226, the entropy decoder 228 retrieves the bitstream data 238C, performs entropy decoding operations 248 on the bitstream data 238C to generate image data 234C, and stores the image data 234C in the ring buffer 226 when space is available in the ring buffer 226. To illustrate, the entropy decoder 228 can store the image data 234C in the ring buffer 226 prior to the pixel processor 224 retrieving the image data 234A, the image data 234B, or both, from the ring buffer 226. For example, unlike a ping-pong buffer, the ring buffer 226 can be used to store image data corresponding to more than two image frames at a given time.

In some examples, the image data 234 can be of different sizes. For example, image data 234A corresponding to an I-frame can have a first size that is greater than a second size of image data 234B corresponding to a P-frame, and the second size of the image data 234B can be greater than a third size of image data 234C corresponding to a B-frame. In a particular aspect, image data corresponding to the same type of image frames can have different sizes. For example, image data 234D corresponding to another I-frame can have a fourth size that is less than the first size of the image data 134A.

The ring buffer 226 does not have predetermined slot sizes. In an example, a write pointer indicates a beginning of a next slot to write to and the entropy decoder 228, subsequent to writing the image data 234A in the ring buffer 226, advances the write pointer to indicate a location that is after the image data 234A in the ring buffer 226. Later, the entropy decoder 228 writes the image data 234B starting at the location indicated by the write pointer and advances the write pointer to indicate a location that is after the image data 234B.

The pixel processor 224 obtains image data 234 of one frame at a time from the ring buffer 226, as further described with reference to FIG. 3, and performs pixel processing operations 244 on the image data 234 to generate an image frame 230. For example, the pixel processor 224 performs pixel processing operations 244 on the image data 234A to generate an image frame 230A. After generating the image frame 230A, the pixel processor 224 obtains the image data 234B from the ring buffer 226 and performs pixel processing operations 244 on the image data 234B to generate an image frame 230B. Because the ring buffer 226 does not have predetermined slot sizes, a read pointer indicates a beginning of a next slot to read from. For example, the pixel processor 224 reads the image data 234A from a location indicated by the read pointer, and after processing the image data 234A advances the read pointer to indicate a location after the image data 234A. Later, the pixel processor 224 reads the image data 234B from the location indicated by the read pointer and advances the read pointer to indicate a location after the image data 234B.

In implementations in which the bitstream data 238 corresponds to the bitstream data 138 of FIG. 1, the image frames 230 correspond to a reproduction of the image frames 130 of FIG. 1. Optionally, in some embodiments, the device 204 provides the image frames 230 to the display buffer 222 to playout at the display 220.

The system 200 thus enables the entropy decoder 228 and the pixel processor 224 to operate asynchronously and exchange image data via the ring buffer 226. Hence, the processing speeds of the entropy decoder 228 and the pixel processor 224 can be decoupled. The system 200 also improves efficiency by enabling any unoccupied space in the ring buffer 226 to be available to store image data because the ring buffer 226 does not have fixed size slots.

Figure 3:
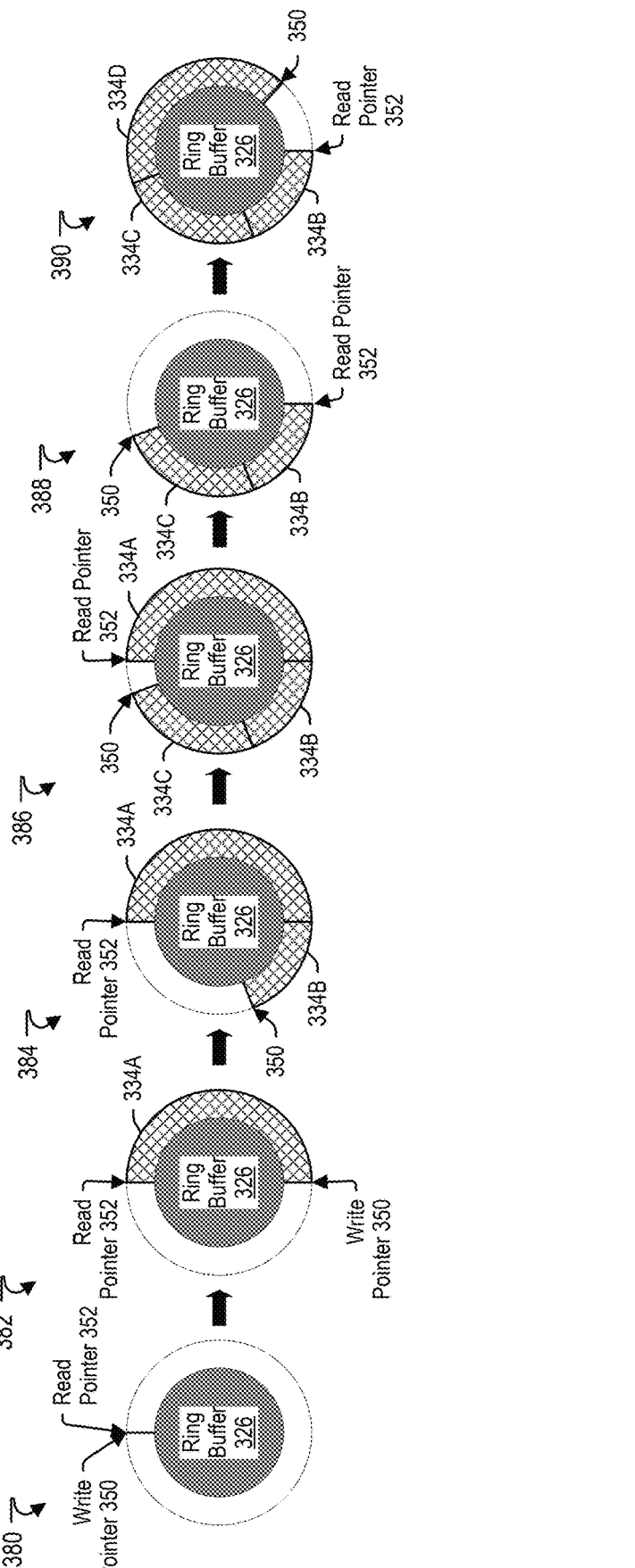
FIG. 3 is a diagram of an illustrative aspect of operation of a buffer controller of the system of FIG. 1 or FIG. 2, in accordance with some examples of the present disclosure.

Referring to FIG. 3, a diagram 300 is shown of an illustrative aspect of operation of a buffer controller 362, in accordance with some examples of the present disclosure. The buffer controller 362 is configured to manage a ring buffer 326. A buffer data producer 360 is configured to store image data 334 in the ring buffer 326, and a buffer data consumer 364 is configured to retrieve image data 334 from the ring buffer 326.

In some embodiments, the buffer controller 362, the buffer data producer 360, and the buffer data consumer 364 correspond to the buffer controller 152, the pixel processor 124, and the entropy encoder 128, respectively, of FIG. 1. In some embodiments, the buffer controller 362, the buffer data producer 360, and the buffer data consumer 364 correspond to the buffer controller 252, the entropy decoder 228, and the pixel processor 224, respectively, of FIG. 2.

In FIG. 3, an example 380 depicts a state of the ring buffer 326 when the ring buffer 326 is empty (e.g., has invalid data). In the example 380, a write pointer 350 and a read pointer 352 are initialized to indicate the same location of the ring buffer 326.

An example 382 depicts a state of the ring buffer 326 after the buffer data producer 360 has written image data 334A to the ring buffer 326. For example, the image data 334A is written starting at the location indicated by the write pointer 350 in the example 380, and the buffer data producer 360 has advanced the write pointer 350 to indicate a location of the ring buffer 326 that is after the image data 334A. In some examples, the buffer data consumer 364 reads the image data 334A starting from the location indicated by the read pointer 352. While the buffer data consumer 364 is reading and processing the image data 334A, the buffer data producer 360 writes image data 334B in the ring buffer 326.

An example 384 depicts a state of the ring buffer 326 after the buffer data producer 360 has written the image data 334B to the ring buffer 326. For example, the image data 334B is written starting at the location indicated by the write pointer 350 in the example 382, and the buffer data producer 360 has advanced the write pointer 350 to indicate a location of the ring buffer 326 that is after the image data 334B. In some examples, while the buffer data consumer 364 continues to read and process the image data 334A, the buffer data producer 360 writes image data 334C in the ring buffer 326.

An example 386 depicts a state of the ring buffer 326 after the buffer data producer 360 has written the image data 334C to the ring buffer 326. For example, the image data 334C is written starting at the location indicated by the write pointer 350 in the example 384, and the buffer data producer 360 has advanced the write pointer 350 to indicate a location of the ring buffer 326 that is after the image data 334C.

An example 388 depicts a state of the ring buffer 326 after the buffer data consumer 364 has read the image data 334A (e.g., to generate the bitstream data 138A of FIG. 1 or the image frame 230A of FIG. 2) and has advanced the read pointer 352 to a location after the image data 334A. For example, the read pointer 352 indicates a location at a beginning of the image data 334B.

An example 390 depicts a state of the ring buffer 326 after the buffer data producer 360 has written image data 334D to the ring buffer 326. For example, the image data 334D is written starting at the location indicated by the write pointer 350 in the example 386 and 388, and the buffer data producer 360 has advanced the write pointer 350 to indicate a location of the ring buffer 326 that is after the image data 334D.

Unlike a conventional (e.g., a two-slot ping-pong) buffer implementation, the buffer data producer 360 did not have to wait to store image data of a third image frame (e.g., the image data 334C) when there is unoccupied space in the ring buffer 326.

Although the buffer data producer 360 is described as writing the image data 334 and updating the write pointer 350, in some other embodiments the buffer data producer 360 sends a write request to the buffer controller 362 and the buffer controller 362 writes the image data 334 when there is space available in the ring buffer 326 and updates the write pointer 350. Although the buffer data consumer 364 is described as retrieving the image data 334 and updating the read pointer 352, in some other embodiments the buffer data consumer 364 sends a read request to the buffer controller 362 and the buffer controller 362 reads the image data 334 when available in the ring buffer 326 and updates the read pointer 352.

Figure 4:
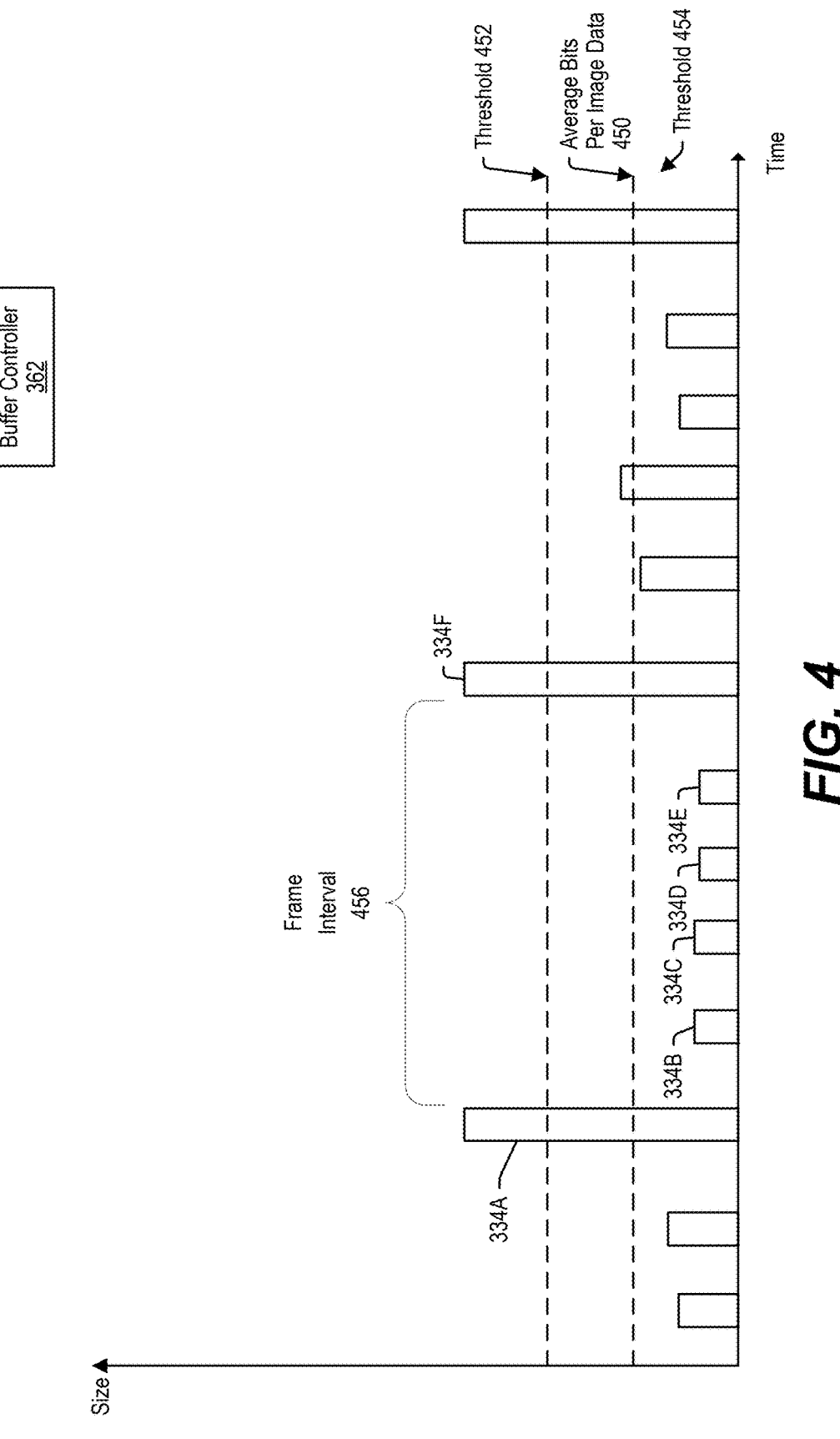
FIG. 4 is a diagram of an illustrative aspect of operation of the buffer controller of FIG. 3, in accordance with some examples of the present disclosure.

Referring to FIG. 4, a diagram 400 is shown of an illustrative aspect of operation of the buffer controller 362 of FIG. 3, in accordance with some examples of the present disclosure. The buffer controller 362 is configured to adjust a size of the ring buffer 326 based on a detected condition of image frames, such as fluctuations in size of the image data 334. In some embodiments, adjusting the size of the ring buffer 326 corresponds to adjusting a size allocation of the ring buffer 326 in a fixed sized hardware memory (e.g., on-chip memory).

In an example, the buffer controller 362 initializes the ring buffer 326 to a default size. In a particular aspect, the default size (M×N) is based on an average bits per image data (M) and an expected frame interval (N). The buffer controller 362 tracks sizes of image data 334 for a threshold count (e.g., 20) of most recent image data stored in the ring buffer 326. The buffer controller 362 selectively updates a size of the ring buffer 326 based on a detected condition of image frames.

Optionally, in some embodiments, the buffer controller 362 selectively updates a size of the ring buffer 326 based on an average bits per image data (M) 450 and a count (e.g., a frame interval (FI) 456) of sets of image data 334 that are smaller than a threshold 452 and that are between sets of image data 334 that are larger than a threshold 454. In some embodiments, the threshold 454 is the same as the average bits per image data (M) 450. In some other embodiments, the threshold 454 is the same as the threshold 452. In some embodiments, the threshold 452 is greater than (e.g., 1.5 times of) the average bits per image data (M) 450.

In the example illustrated in FIG. 4, a size of image data 334A and a size of image data 334F are each greater than the threshold 454. A size of each of image data 334B, image data 334C, the image data 334D, and image data 334E between the image data 334A and the image data 334F is less than the threshold 452. The FI 456 corresponds to a count (e.g., 4) of sets of image data (the image data 334B, the image data 334C, the image data 334D, and the image data 334E) that are smaller than the threshold 452 and that are between sets of image data 334 (e.g., the image data 334A and the image data 334F) that are larger than the threshold 454.

In a particular aspect, a set of image data (the image data 334B, the image data 334C, the image data 334D, or image data 334E) that is smaller than the threshold 452 corresponds to a B-frame, whereas a set of image data (e.g., the image data 334A or the image data 334F) that is greater than the threshold 454 corresponds to a P-frame or an I-frame. To illustrate, the FI 456 can correspond to a count of B-frames between a pair of P-frames, between a pair of I-frames, or between a P-frame and an I-frame. To illustrate, the FI 456 can correspond to a count of P-frames with smaller image data between a pair of P-frames with larger image data, between a pair of I-frames, or between a P-frame with larger image data and an I-frame. The buffer controller 362 increases the size of the ring buffer 326 in response to determining that the size (M×N) is less than a target size (M×FI). For example, if N<FI, the buffer controller 362 sets N (e.g., expected frame interval) to FI 456 (e.g., detected frame interval) to increase the size of the ring buffer 326.

In a particular example, a large number of the frames (e.g., all the frames) have a similar size (e.g., less than the threshold 452) and there are few or no larger frames (e.g., with a size greater than the threshold 454). For example, the similar size frames match the average bits per image data (M) 450. In this example, the frame interval 456 can be very large and the buffer controller 362, in response to determining that the frame interval 456 is greater than a frame interval threshold, refrains from updating N (e.g., the expected frame interval) and refrains from increasing the size of the ring buffer 326.

Alternatively, if N>FI, in a first mode, the buffer controller 362 does not decrease the size of the ring buffer 326. In a second mode, if N>FI, the buffer controller 362 sets N (e.g., expected frame interval) to the FI 456 (e.g., detected frame interval) to decrease the size of the ring buffer 326. The mode of the buffer controller 362 can be based on a configuration setting, default data, or a user input.

The buffer controller 362 thus selectively updates a size of the ring buffer 326 based on a detected condition of image frames. For example, the detected condition is based on a count (e.g., 4) of a second set of image data that are smaller (the image data 334B, the image data 334C, the image data 334D, and the image data 334E) than the threshold 452 and are between a first set of image data (e.g., the image data 334A) and a second set of image data (e.g., the image data 334F) that are larger than the threshold 454.

In some examples, the detected condition is based on a representative size of image data of a set of previously processed frames. For example, the representative size can be based on a largest size of image data of the set of previously processed frames (e.g., a size of the image data 334A), an average size of image data of the set of previously processed frames (e.g., the average bits per image data (M) 450), or both. To illustrate, the buffer controller 362 sets the size of the ring buffer 326 based on a target size (M×FI), as described herein, such that the size of the ring buffer 326 is greater than or equal to the largest size of image data of the set of previously processed frames (e.g., a size of the image data 334A).

The buffer controller 362 can thus dynamically adjust the size of the ring buffer 326 to conserve memory allocated to the ring buffer 326 while having available space in the ring buffer 326 to accommodate image data 334 from the buffer data producer 360.

FIG. 5 depicts an implementation 500 of the device 102 of FIG. 1, the device 204 of FIG. 2, or both, as an integrated circuit 502 that includes one or more processors 590 (e.g., a system-on-chip). In some embodiments, the one or more processors 590 include the pixel processor 124, the entropy encoder 128, the pixel processor 224, the entropy decoder 228, or a combination thereof. In some embodiments, the one or more processors 590 include on-chip memory 532 that includes the ring buffer 126, the ring buffer 226, or both.

In some embodiments, the one or more processors 590 include the buffer controller 152, the buffer controller 252, or both.

The integrated circuit 502 also includes a signal input 504, such as one or more bus interfaces, to enable input data 528 to be received for processing. The integrated circuit 502 also includes a signal output 506, such as a bus interface, to enable sending of output data 550. In some embodiments, the input data 528 includes the image frames 130 and the output data 550 includes the bitstream data 138. In some embodiments, the input data 528 includes the bitstream data 238 and the output data 550 includes the image frames 230.

Figure 6:
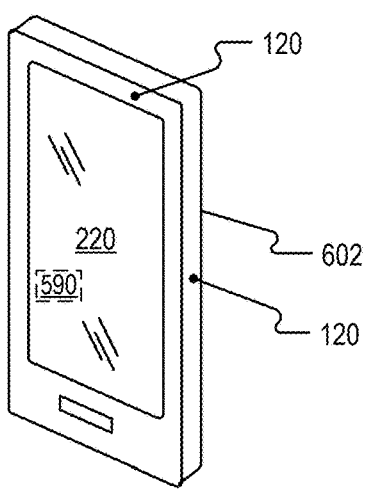
FIG. 6 is a diagram of a mobile device operable to buffer image data between a pixel processor and an entropy coder, in accordance with some examples of the present disclosure.
Figure 7:
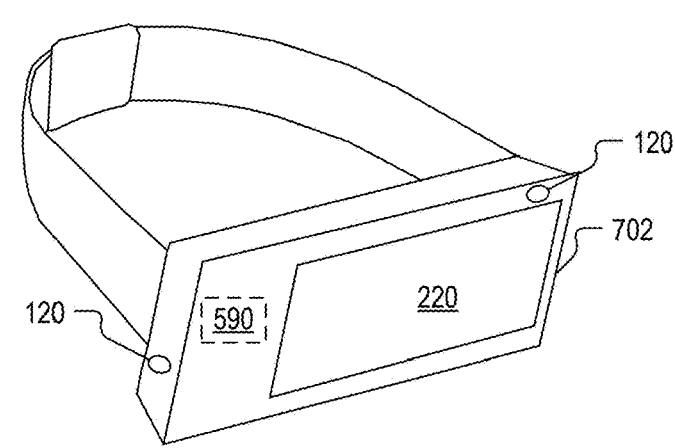
FIG. 7 is a diagram of a wearable electronic device operable to buffer image data between a pixel processor and an entropy coder, in accordance with some examples of the present disclosure.
Figure 8:
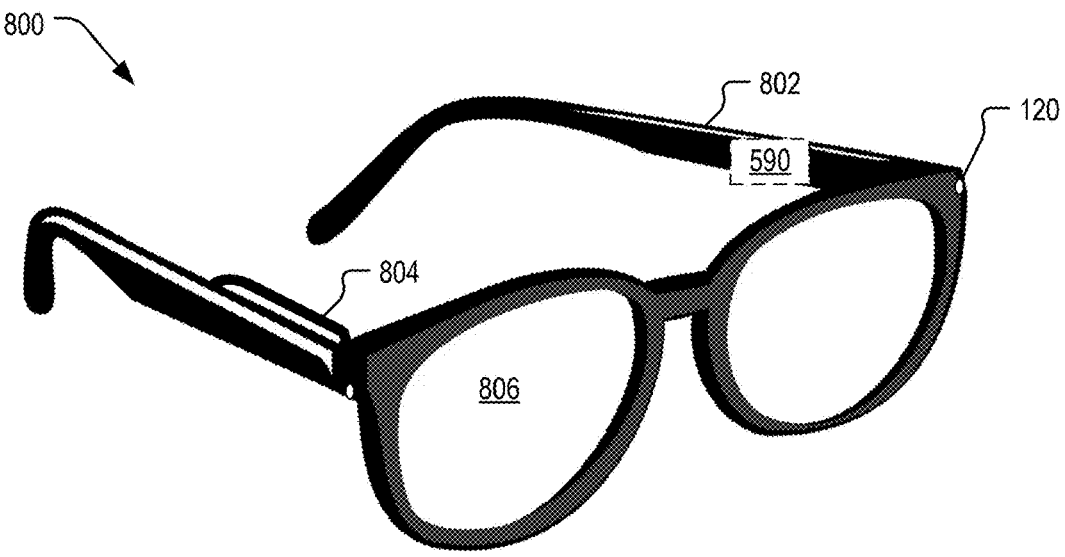
FIG. 8 is a diagram of a mixed reality or augmented reality glasses operable to buffer image data between a pixel processor and an entropy coder, in accordance with some examples of the present disclosure.
Figure 9:
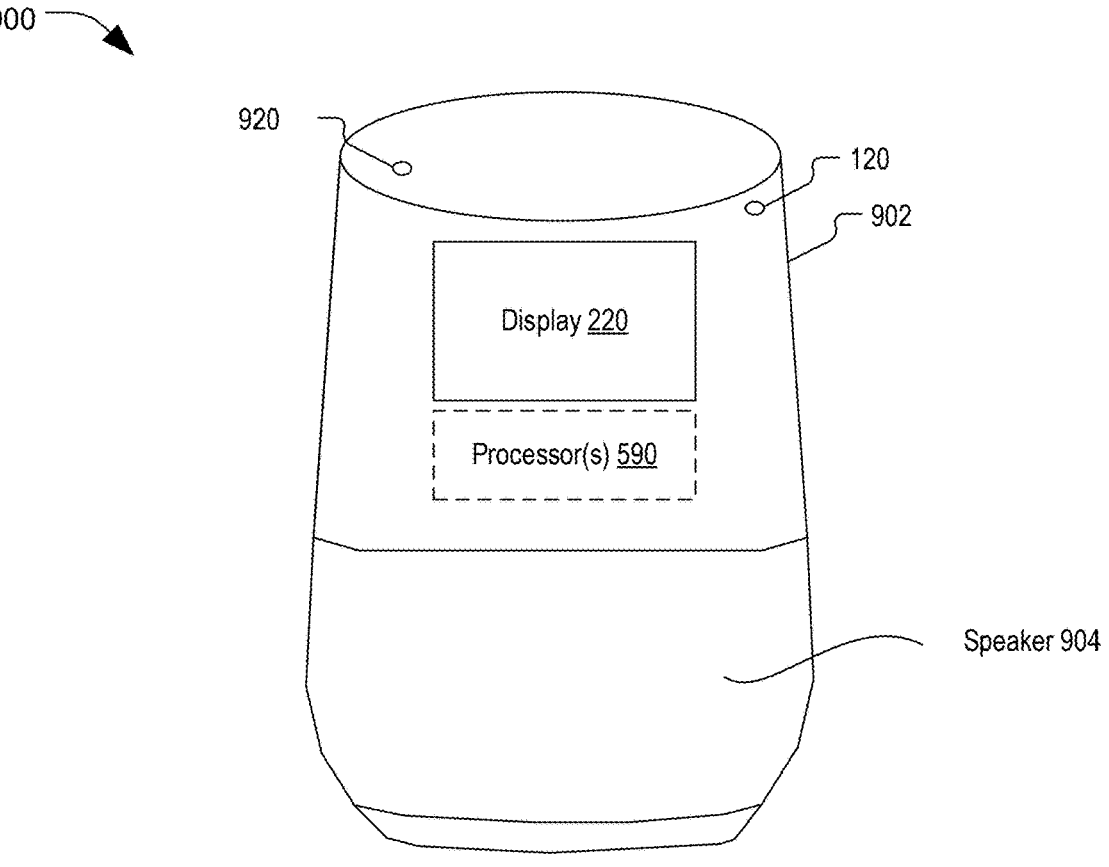
FIG. 9 is a diagram of a voice-controlled speaker system operable to buffer image data between a pixel processor and an entropy coder, in accordance with some examples of the present disclosure.
Figure 10:
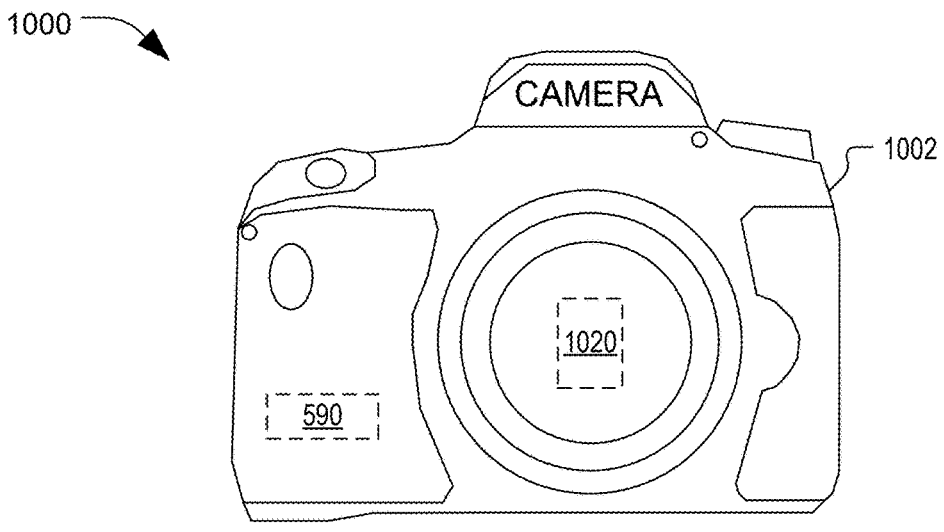
FIG. 10 is a diagram of a camera operable to buffer image data between a pixel processor and an entropy coder, in accordance with some examples of the present disclosure.
Figure 13:
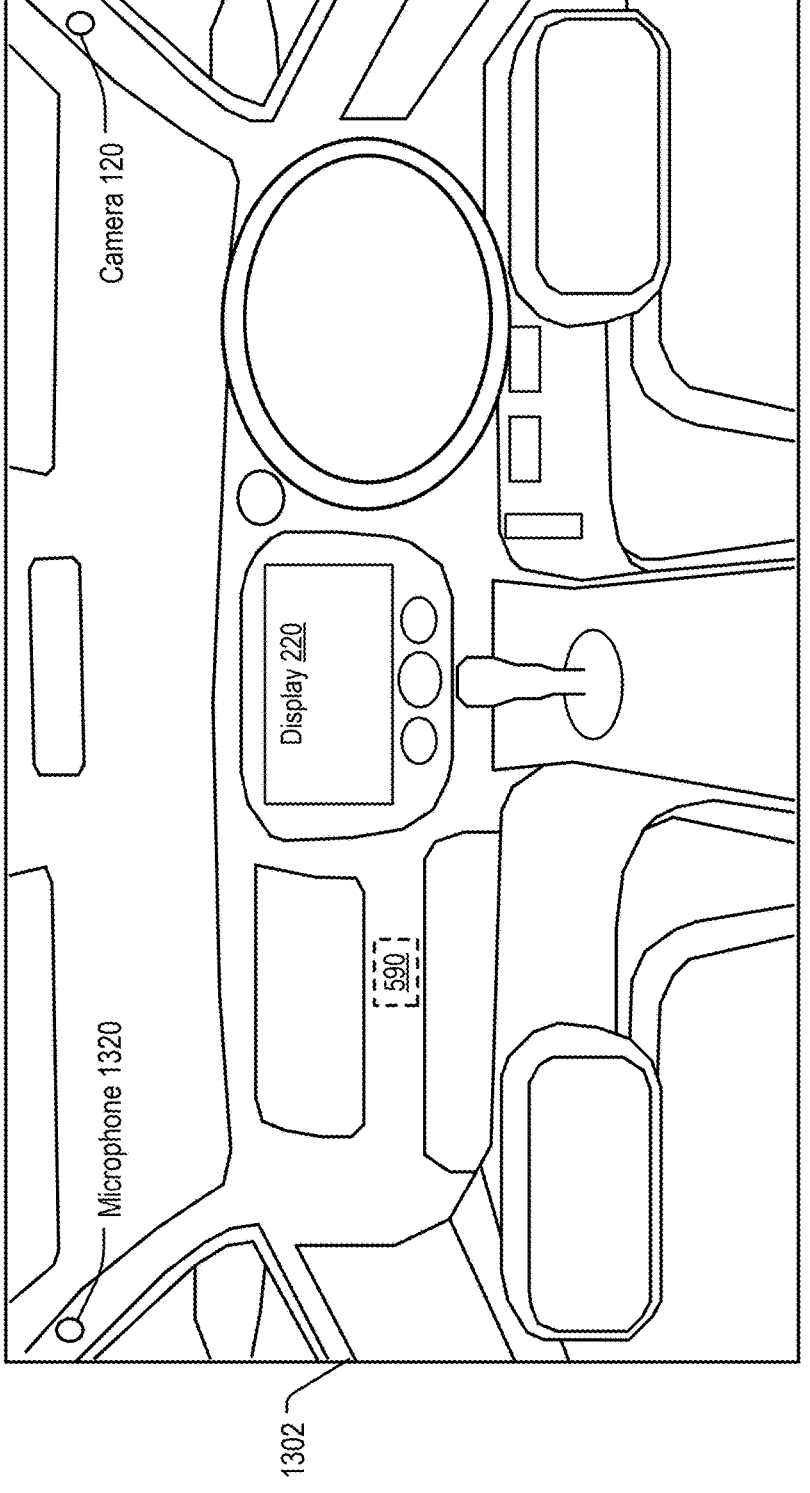
FIG. 13 is a diagram of a second example of a vehicle operable to buffer image data between a pixel processor and an entropy coder, in accordance with some examples of the present disclosure.

The integrated circuit 502 enables implementation of buffering image data between a pixel processor and an entropy coder as a component in a system that includes a camera, a display, or both, such as a mobile phone or tablet as depicted in FIG. 6, a wearable electronic device as depicted in FIG. 7, augmented reality or mixed reality glasses as depicted in FIG. 8, a voice-controlled speaker system as depicted in FIG. 9, a camera as depicted in FIG. 10, a virtual reality, mixed reality, or augmented reality headset as depicted in FIG. 11, or a vehicle as depicted in FIG. 12 or FIG. 13.

FIG. 6 depicts an implementation 600 in which the device 102, the device 204, or both, include a mobile device 602, such as a phone or tablet, as illustrative, non-limiting examples. The mobile device 602 includes one or more cameras 120 and the display 220 (e.g., a display screen). Components of the processor 590, including the pixel processor 124, the entropy encoder 128, the pixel processor 224, the entropy decoder 228, the buffer controller 152, the buffer controller 252, the on-chip memory 532, or a combination thereof, are integrated in the mobile device 602 and are illustrated using dashed lines to indicate internal components that are not generally visible to a user of the mobile device 602. In a particular example, the mobile device 602 operates to detect user voice activity, which is then processed to perform one or more operations at the mobile device 602, such as to launch a graphical user interface or otherwise display other information associated with the user's speech at the display 220 (e.g., via an integrated "smart assistant" application). To illustrate, the mobile device 602, in response to receiving a user input to transmit camera output to another device, displays a notification on the display 220 that output of the camera 120 is being transmitted. In another example, the mobile device 602, in response to a user input to display a video received from another device, provides the image frames 230 to the display 220.

FIG. 7 depicts an implementation 700 in which the device 102, the device 204, or both, include a wearable electronic device 702, illustrated as a "smart watch." One or more cameras 120 and components of the processor 590, including the pixel processor 124, the entropy encoder 128, the pixel processor 224, the entropy decoder 228, the buffer controller 152, the buffer controller 252, the on-chip memory 532, or a combination thereof, are integrated into the wearable electronic device 702. In a particular example, the wearable electronic device 702 operates to detect user voice activity, which is then processed to perform one or more operations at the wearable electronic device 702, such as to launch a graphical user interface or otherwise display other information associated with the user's speech at a display 220 (e.g., a display screen) of the wearable electronic device 702. To illustrate, the wearable electronic device 702, in response to receiving a user input to transmit camera output to another device, displays a notification on the display 220 that output of the camera 120 is being transmitted. In another example, the wearable electronic device 702, in response to a user input to display a video received from another device, provides the image frames 230 to the display 220.

In a particular example, the wearable electronic device 702 includes a haptic device that provides a haptic notification (e.g., vibrates) in response to detection of user voice activity. For example, the haptic notification can cause a user to look at the wearable electronic device 702 to see a displayed notification indicating that output of the camera 120 is being transmitted or that image frames 230 are available for viewing.

FIG. 8 depicts an implementation 800 in which the device 102, the device 204, or both, include a portable electronic device that corresponds to augmented reality or mixed reality glasses 802. The glasses 802 include a holographic projection unit 804 configured to project visual data onto a surface of a lens 806 or to reflect the visual data off of a surface of the lens 806 and onto the wearer's retina. In a particular aspect, the lens 806 corresponds to the display 220 of FIG. 2. One or more cameras 120 and components of the processor 590, including the pixel processor 124, the entropy encoder 128, the pixel processor 224, the entropy decoder 228, the buffer controller 152, the buffer controller 252, the on-chip memory 532, or a combination thereof, are integrated into the glasses 802. The pixel processor 124 and the entropy encoder 128 may function to generate the bitstream data 138 based on image frames received from the camera 120. In a particular example, the holographic projection unit 804 is configured to display a notification indicating that camera output is being transmitted to another device. In a particular example, the holographic projection unit 804 is configured to display a notification indicating that the image frames 230 are available for viewing.

FIG. 9 is an implementation 900 in which the device 102, the device 204, or both, include a wireless speaker and voice activated device 902. The wireless speaker and voice activated device 902 can have wireless network connectivity and is configured to execute an assistant operation. One or more cameras 120 and the processor 590 including the pixel processor 124, the entropy encoder 128, the pixel processor 224, the entropy decoder 228, the buffer controller 152, the buffer controller 252, the on-chip memory 532, or a combination thereof, are included in the wireless speaker and voice activated device 902. The wireless speaker and voice activated device 902 also includes the display 220 (e.g., a display screen), a speaker 904 and one or more microphones 920. During operation, in response to receiving a verbal command identified as user speech, the wireless speaker and voice activated device 902 can execute assistant operations, such as via execution of a voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant"). In some examples, the assistant operations can include generating bitstream data 138 from camera output of the camera 120 for transmission to another device, generating the image frames 230 from bitstream data 238 received from another device for viewing on the display 220, or both.

FIG. 10 depicts an implementation 1000 in which the device 102, the device 204, or both, include a portable electronic device that corresponds to a camera device 1002. The processor 590 including the pixel processor 124, the entropy encoder 128, the pixel processor 224, the entropy decoder 228, the buffer controller 152, the buffer controller 252, the on-chip memory 532, or a combination thereof, are included in the camera device 1002. The camera device 1002 includes an image sensor 1020 corresponding to the camera 120 of FIG. 1. During operation, in response to receiving a verbal command identified as user speech, the camera device 1002 can execute operations responsive to spoken user commands, such as to adjust image or video capture settings, image or video playback settings, or image or video capture instructions, as illustrative examples. In some examples, the camera device 1002 can generate bitstream data 138 from output of the image sensor 1020 for transmission to another device, generate the image frames 230 from bitstream data 238 received from another device for viewing on a display (not shown), or both.

FIG. 11 depicts an implementation 1100 in which the device 102, the device 204, or both, include a portable electronic device that corresponds to a virtual reality, mixed reality, or augmented reality headset 1102. One or more cameras 120 and the processor 590 including the pixel processor 124, the entropy encoder 128, the pixel processor 224, the entropy decoder 228, the buffer controller 152, the buffer controller 252, the on-chip memory 532, or a combination thereof, are integrated into the headset 1102. In a particular aspect, the headset 1102 can perform user voice activity detection based on audio signals received from a microphone 1120 of the headset 1102. A visual interface device is positioned in front of the user's eyes to enable display of augmented reality, mixed reality, or virtual reality images or scenes to the user while the headset 1102 is worn. In a particular example, the visual interface device is configured to display a notification indicating that camera output from the camera 120 is being transmitted to another device. In a particular example, the visual interface device is configured to display the image frames 230 generated from the bitstream data 238 received from another device.

FIG. 12 depicts an implementation 1200 in which the device 102, the device 204, or both, correspond to, or are integrated within, a vehicle 1202, illustrated as a manned or unmanned aerial device (e.g., a package delivery drone). One or more cameras 120 and the processor 590 including the pixel processor 124, the entropy encoder 128, the pixel processor 224, the entropy decoder 228, the buffer controller 152, the buffer controller 252, the on-chip memory 532, or a combination thereof, are integrated into the vehicle 1202. In a particular example, the vehicle 1202 generates bitstream data 138 from image frames 130 received from the camera 120 for storage, transmission, or both. In a particular example, the vehicle 1202 generates image frames 230 from bitstream data 238 received from another device and provides the image frames 230 to a display screen (not shown) for viewing by a user (e.g., a recipient of a package).

FIG. 13 depicts another implementation 1300 in which the device 102, the device 204, or both, correspond to, or are integrated within, a vehicle 1302, illustrated as a car. The vehicle 1302 includes the processor 590 including the pixel processor 124, the entropy encoder 128, the pixel processor 224, the entropy decoder 228, the buffer controller 152, the buffer controller 252, the on-chip memory 532, or a combination thereof. The vehicle 1302 also includes one or more cameras 120, one or more microphones 1320, and the display 220 (e.g., a display screen). User voice activity detection can be performed based on audio signals received from the microphone 1320 of the vehicle 1302. In some implementations, user voice activity detection can be performed based on an audio signal received from interior microphones (e.g., the microphone 1320), such as for a voice command from an authorized passenger. For example, the user voice activity detection can be used to detect a voice command from an operator of the vehicle 1302 (e.g., from a parent to set a volume to 5 or to set a destination for a self-driving vehicle) and to disregard the voice of another passenger (e.g., a voice command from a child to set the volume to 10 or other passengers discussing another location). In some implementations, user voice activity detection can be performed based on an audio signal received from external microphones (e.g., the microphone 1320), such as an authorized user of the vehicle 1302. In a particular implementation, in response to receiving a verbal command identified as user speech, a voice activation system initiates one or more operations of the vehicle 1302 based on one or more keywords (e.g., "unlock," "start engine," "play music," "display weather forecast," or another voice command) detected in a microphone output signal, such as by providing feedback or information via the display 220 or one or more speakers.

In a particular example, the vehicle 1302 generates bitstream data 138 from image frames 130 received from the camera 120 for storage, transmission, or both. In a particular example, the vehicle 1302 generates image frames 230 from bitstream data 238 received from another device and provides the image frames 230 to the display 220 for viewing by a passenger.

Referring to FIG. 14, a particular implementation of a method 1400 of buffering image data between a pixel processor and an entropy encoder is shown. In a particular aspect, one or more operations of the method 1400 are performed by at least one of the pixel processor 124, the entropy encoder 128, the ring buffer 126, the buffer controller 152, the device 102, the system 100 of FIG. 1, the device 202, the system 200 of FIG. 2, the buffer data producer 360, the buffer controller 362, the buffer data consumer 364 of FIG. 3, or a combination thereof.

The method 1400 includes retrieving, by an entropy encoder and from a ring buffer, first image data of a first image frame of a sequence of image frames, at 1402. For example, the entropy encoder 128 retrieves, from a ring buffer 126, the image data 134A of an image frame 130A of a sequence of image frames 130, as described with reference to FIG. 1.

The method 1400 also includes encoding, at the entropy encoder, the first image data to generate first bitstream data, at 1404. For example, the entropy encoder 128 encodes the image data 134A to generate the bitstream data 138A, as described with reference to FIG. 1.

The method 1400 further includes processing, at a pixel processor, a second image frame of the sequence of image frames to generate second image data, at 1406. For example, the pixel processor 124 process the image frame 130B of the sequence of image frames 130 to generate image data 134B, as described with reference to FIG. 1.

The method 1400 includes storing, by the pixel processor, the second image data in the ring buffer, at 1408. For example, the pixel processor 124 stores the image data 134B in the ring buffer 126.

The method 1400 thus enables decoupling of the processing speeds of the pixel processor 124 and the entropy encoder 128. For example, if the pixel processor 124 generates the image data 134B faster than the entropy encoder 128 processes the image data 134A, the pixel processor 124 can store the image data 134B in the ring buffer 126 and continue processing of the image frame 130C without waiting for the entropy encoder 128 to free up the space occupied by the image data 134A and start to retrieve the image data

134B. To illustrate, the pixel processor 124 can generate and store the image data 134B and the image data 134C in the ring buffer 226, instead of starting to generate the image data 134D after the entropy encoder 128 frees up the space occupied by the image data 134B and starts to retrieve the image data 134C.

In some embodiments, the pixel processor 124 generates image data at a substantially constant speed per image frame, whereas the entropy encoder 128 processes image data at variable speeds based on size of the image data. For example, the entropy encoder 128 processes smaller image data faster than larger image data. When the entropy encoder 128 takes longer to process the image data 134A, the pixel processor 124 can store the image data 134B and the image data 134C in the ring buffer 126 without waiting for the entropy encoder 128 to free up space occupied by the image data 134A. If the entropy encoder 128 processes the image data 134B faster, the image data 134C is available in the ring buffer 126 without the entropy encoder 128 having to wait for the pixel processor 124 to generate the image data 134C. The decoupling of the processing speeds of the pixel processor 124 and the entropy encoder 128 thus increases overall efficiency.

The method 1400 of FIG. 14 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1400 of FIG. 14 may be performed by a processor that executes instructions, such as described with reference to FIG. 16.

Referring to FIG. 15, a particular implementation of a method 1500 of buffering image data between an entropy decoder and a pixel processor is shown. In a particular aspect, one or more operations of the method 1500 are performed by at least one of the device 104, the system 100 of FIG. 1, the pixel processor 224, the entropy decoder 228, the ring buffer 226, the buffer controller 252, the device 204, the system 200 of FIG. 2, the buffer data producer 360, the buffer controller 362, the buffer data consumer 364 of FIG. 3, or a combination thereof.

The method 1500 includes retrieving, by a pixel processor and from a ring buffer, first image data of a first image frame of a sequence of image frames, at 1502. For example, the pixel processor 224 retrieves, from a ring buffer 226, image data 234A of an image frame 230A of a sequence of image frames 230, as described with reference to FIG. 2.

The method 1500 also includes processing, at the pixel processor, the first image data to generate the first image frame, at 1504. For example, the pixel processor 224 processes the image data 234A to generate the image frame 230A, as described with reference to FIG. 2.

The method 1500 further includes decoding, at an entropy decoder, bitstream data to generate second image data of a second image frame of the sequence of image frames, at 1506. For example, the entropy decoder 228 decodes bitstream data 238B to generate image data 234B of an image frame 230B of the sequence of image frames 230, as described with reference to FIG. 2.

The method 1500 also includes storing, by the entropy decoder, the second image data in the ring buffer, at 1508. For example, the entropy decoder 228 stores the image data 234B in the ring buffer 226, as described with reference to FIG. 2.

The method 1500 enables decoupling of the processing speeds of the entropy decoder 228 and the pixel processor

224. For example, if the entropy decoder 228 generates the image data 234B faster than the pixel processor 224 processes the image data 234A, the entropy decoder 228 can store the image data 234B in the ring buffer 226 and continue processing of the bitstream data 238C without waiting for the pixel processor 224 to free up space occupied by image data 234A and start to retrieve the image data 234B. To illustrate, the entropy decoder 228 can generate and store the image data 234B and the image data 234C in the ring buffer 226 to have longer to generate image data 234D, instead of starting to generate the image data 234D after the pixel processor 224 retrieves the image data 234C. For example, the pixel processor 224 can retrieve multiple sets of image data (e.g., the image data 234B and the image data 234C) from the ring buffer 226 while the entropy decoder generates image data 234D that takes longer than processing of the image data 234C by the pixel processor 224.

The method 1500 of FIG. 15 may be implemented by a FPGA device, an ASIC, a processing unit such as a CPU, a DSP, a controller, another hardware device, firmware device, or any combination thereof. As an example, the method 1500 of FIG. 15 may be performed by a processor that executes instructions, such as described with reference to FIG. 16.

Figure 16:
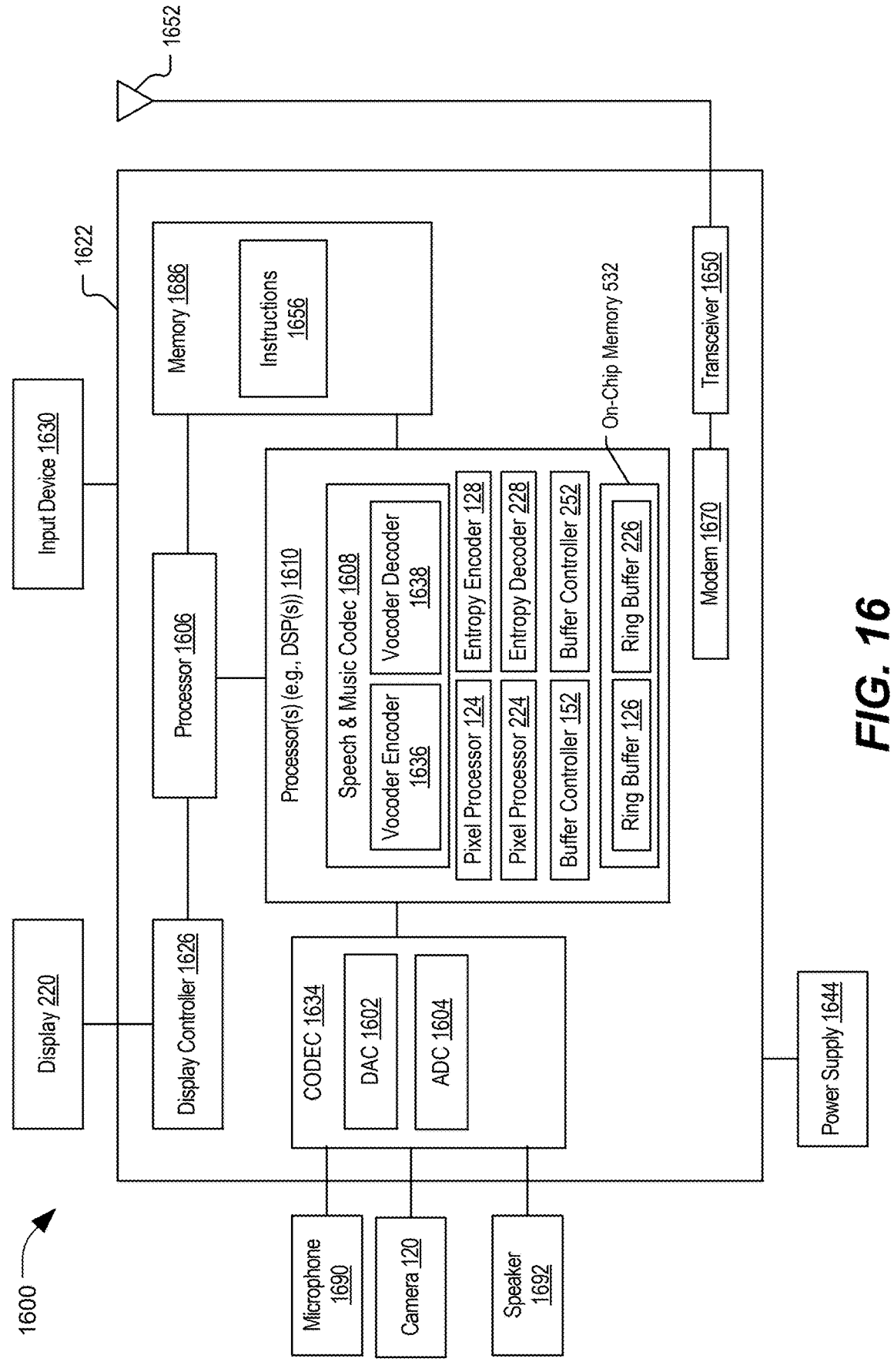
FIG. 16 is a block diagram of a particular illustrative example of a device that is operable to buffer image data between a pixel processor and an entropy coder, in accordance with some examples of the present disclosure.

Referring to FIG. 16, a block diagram of a particular illustrative implementation of a device is depicted and generally designated 1600. In various implementations, the device 1600 may have more or fewer components than illustrated in FIG. 16. In an illustrative implementation, the device 1600 may correspond to the device 102, the device 204, or both. In an illustrative implementation, the device 1600 may perform one or more operations described with reference to FIGS. 1-15.

In a particular implementation, the device 1600 includes a processor 1606 (e.g., a CPU). The device 1600 may include one or more additional processors 1610 (e.g., one or more DSPs). In a particular aspect, the processor 590 of FIG. 5 corresponds to the processor 1606, the processors 1610, or a combination thereof. The processors 1610 may include a speech and music coder-decoder (CODEC) 1608 that includes a voice coder ("vocoder") encoder 1636, a vocoder decoder 1638, or a combination thereof. The processors 1610 include the pixel processor 124, the entropy encoder 128, the pixel processor 224, the entropy decoder 228, the buffer controller 152, the buffer controller 252, the on-chip memory 532, or a combination thereof.

The device 1600 may include a memory 1686 and a CODEC 1634. The memory 1686 may include instructions 1656, that are executable by the one or more additional processors 1610 (or the processor 1606) to implement the functionality described with reference to the pixel processor 124, the entropy encoder 128, the pixel processor 224, the entropy decoder 228, or a combination thereof. The device 1600 may include a modem 1670 coupled, via a transceiver 1650, to an antenna 1652.

The device 1600 may include the display 220 coupled to a display controller 1626. A speaker 1692, a microphone 1690, and a camera 120 may be coupled to the CODEC 1634. The CODEC 1634 may include a digital-to-analog converter (DAC) 1602, an analog-to-digital converter (ADC) 1604, or both. In a particular implementation, the CODEC 1634 may receive analog signals from the microphone 1690, convert the analog signals to digital signals using the analog-to-digital converter 1604, and provide the digital signals to the speech and music codec 1608. The speech and music codec 1608 may process the digital signals. In a particular implementation, the speech and music codec 1608 may provide digital signals to the CODEC 1634. The CODEC 1634 may convert the digital signals to analog signals using the digital-to-analog converter 1602 and may provide the analog signals to the speaker 1692. In a particular implementation, the CODEC 1634 may receive analog signals from the camera 120, convert the analog signals to digital signals using the analog-to-digital converter 1604, and provide the digital signals to the pixel processor 224.

In a particular implementation, the device 1600 may be included in a system-in-package or system-on-chip device 1622. In a particular implementation, the memory 1686, the processor 1606, the processors 1610, the display controller 1626, the CODEC 1634, and the modem 1670 are included in the system-in-package or system-on-chip device 1622. In a particular implementation, an input device 1630 and a power supply 1644 are coupled to the system-in-package or the system-on-chip device 1622. Moreover, in a particular implementation, as illustrated in FIG. 16, the display 220, the input device 1630, the speaker 1692, the microphone 1690, the camera 120, the antenna 1652, and the power supply 1644 are external to the system-in-package or the system-on-chip device 1622. In a particular implementation, each of the display 220, the input device 1630, the speaker 1692, the microphone 1690, the antenna 1652, and the power supply 1644 may be coupled to a component of the system-in-package or the system-on-chip device 1622, such as an interface or a controller.

The device 1600 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for retrieving, from a ring buffer, first image data of a first image frame of a sequence of image frames. For example, the means for retrieving can correspond to the entropy encoder 128, the buffer controller 152, the device 102, the system 100 of FIG. 1, the buffer data consumer 364, the buffer controller 362 of FIG. 3, the processor 1606, the processor(s) 1610, the device 1600, one or more other circuits or components configured to retrieve image data from a ring buffer, or any combination thereof.

The apparatus also includes means for encoding the first image data at an entropy encoder to generate first bitstream data. For example, the means for encoding can correspond to the entropy encoder 128, the device 102, the system 100 of FIG. 1, the buffer data consumer 364 of FIG. 3, the processor 1606, the processor(s) 1610, the device 1600, one or more other circuits or components configured to encode image data at an entropy encoder to generate bitstream data, or any combination thereof.

The apparatus further includes means for processing a second image frame of the sequence of image frames at a pixel processor to generate second image data. For example, the means for processing can correspond to the pixel processor 124, the device 102, the system 100 of FIG. 1, the buffer data producer 360 of FIG. 3, the processor 1606, the processor(s) 1610, the device 1600, one or more other circuits or components configured to process an image frame at a pixel processor to generate image data, or any combination thereof.

The apparatus also includes means for storing the second image data in the ring buffer. For example, the means for storing can correspond to the pixel processor 124, the buffer controller 152, the device 102, the system 100 of FIG. 1, the buffer data producer 360, the buffer controller 362 of FIG. 3, the processor 1606, the processor(s) 1610, the device 1600, one or more other circuits or components configured to store image data in a ring buffer, or any combination thereof.

In conjunction with the described implementations, an apparatus includes means for retrieving, from a ring buffer, first image data of a first image frame of a sequence of image frames. For example, the means for retrieving can correspond to the pixel processor 224, the buffer controller 252, the device 204, the system 200 of FIG. 2, the buffer data consumer 364, the buffer controller 362 of FIG. 3, the processor 1606, the processor(s) 1610, the device 1600, one or more other circuits or components configured to retrieve image data from a ring buffer, or any combination thereof.

The apparatus also includes means for processing the first image data at a pixel processor to generate the first image frame. For example, the means for processing can correspond to the pixel processor 224, the device 204, the system 200 of FIG. 2, the buffer data consumer 364 of FIG. 3, the processor 1606, the processor(s) 1610, the device 1600, one or more other circuits or components configured to process image data at a pixel processor to generate an image frame, or any combination thereof.

The apparatus further includes means for decoding bitstream data at an entropy decoder to generate second image data of a second image frame of the sequence of image frames. For example, the means for decoding can correspond to the entropy decoder 228, the device 204, the system 200 of FIG. 2, the buffer data producer 360 of FIG. 3, the processor 1606, the processor(s) 1610, the device 1600, one or more other circuits or components configured to decode bitstream data at an entropy decoder to generate image data, or any combination thereof.

The apparatus also includes means for storing the second image data in the ring buffer. For example, the means for storing can correspond to the entropy decoder 228, the buffer controller 252, the device 204, the system 200 of FIG. 2, the buffer data producer 360, the buffer controller 362 of FIG. 3, the processor 1606, the processor(s) 1610, the device 1600, one or more other circuits or components configured to store image data in a ring buffer, or any combination thereof.

In some implementations, a non-transitory computer-readable medium (e.g., a computer-readable storage device, such as the memory 1686) stores instructions (e.g., the instructions 1656) that, when executed by one or more processors (e.g., the one or more processors 590, the one or more processors 1610, or the processor 1606), cause the one or more processors to retrieve, from a ring buffer (e.g., the ring buffer 126 or the ring buffer 326), first image data (e.g., the image data 134A or the image data 334A) of a first image frame (e.g., the image frame 130A) of a sequence of image frames (e.g., the image frames 130). The instructions, when executed by the processor, also cause the processor to encode the first image data at an entropy encoder (e.g., the entropy encoder 128 or the buffer data consumer 364) to generate first bitstream data (e.g., the bitstream data 138A).

The instructions, when executed by the processor, further cause the processor to process a second image frame (e.g., the image frame 130B) of the sequence of image frames at a pixel processor (e.g., the pixel processor 124 or the buffer data producer 360) to generate second image data (e.g., the image data 134B or the image data 334B). The instructions, when executed by the processor, also cause the processor to store the second image data in the ring buffer.

In some implementations, a non-transitory computer-readable medium (e.g., a computer-readable storage device, such as the memory 1686) stores instructions (e.g., the instructions 1656) that, when executed by one or more processors (e.g., the one or more processors 590, the one or more processors 1610, or the processor 1606), cause the one or more processors to retrieve, from a ring buffer (e.g., the ring buffer 226 or the ring buffer 326), first image data (e.g., the image data 234A or the image data 334A) of a first image frame (e.g., the image frame 230A) of a sequence of image frames (e.g., the image frames 230). The instructions, when executed by the processor, also cause the processor to process the first image data at a pixel processor (e.g., the pixel processor 224 or the buffer data consumer 364) to generate the first image frame. The instructions, when executed by the processor, further cause the processor to decode bitstream data at an entropy decoder (e.g., the entropy decoder 228 or the buffer data producer 360) to generate second image data (e.g., the image data 234B or the image data 334B) of a second image frame (e.g., the image frame 230B) of the sequence of image frames. The instructions, when executed by the processor, also cause the processor to store the second image data in the ring buffer.

Particular aspects of the disclosure are described below in sets of interrelated Examples:

According to Example 1, a device includes a ring buffer; an entropy encoder coupled to the ring buffer and configured to retrieve, from the ring buffer, first image data of a first image frame of a sequence of image frames; and encode the first image data to generate first bitstream data; and a pixel processor coupled to the ring buffer and configured to process a second image frame of the sequence of image frames to generate second image data; and store the second image data in the ring buffer.

Example 2 includes the device of Example 1, wherein the pixel processor is configured to store third image data of a third image frame of the sequence of image frames in the ring buffer prior to the entropy encoder retrieving the second image data from the ring buffer.

Example 3 includes the device of Example 1 or Example 2, further comprising a buffer controller configured to adjust a size allocation of the ring buffer based on a detected condition of the sequence of image frames.

Example 4 includes the device of Example 3, wherein the detected condition is based on a representative size of image data of a set of previously processed frames of the sequence of image frames.

Example 5 includes the device of Example 4, wherein the buffer controller is configured to determine the representative size based on a largest size of image data of the set of previously processed frames.

Example 6 includes the device of Example 4 or Example 5, wherein the buffer controller is configured to determine the representative size based on an average size of image data of the set of previously processed frames.

Example 7 includes the device of any of Examples 3 to 6, wherein the pixel processor is configured to generate a sequence of sets of image data corresponding to a set of previously processed frames of the sequence of image frames, wherein the sequence of sets of image data includes a first set of image data larger than a threshold, one or more second sets of image data smaller than the threshold, and a third set of image data larger than the threshold, wherein the buffer controller is configured to determine a count of the one or more second sets based on detecting that each of the one or more second sets is smaller than the threshold and that each of the first set of image data and the third set of image data is larger than the threshold, and wherein the detected condition is based on the count of the one or more second sets.

Example 8 includes the device of any of Examples 3 to 7, wherein the pixel processor is configured to generate sets of image data smaller than a threshold, the sets of image data corresponding to a set of previously processed frames of the sequence of image frames, and wherein the buffer controller is configured to, based on determining that a count of the sets of image data is greater than a frame interval threshold, refrain from increasing the size allocation of the ring buffer.

Example 9 includes the device of any of Examples 1 to 8, and further includes a buffer controller configured to, after the first image data is written to the ring buffer, advance a write pointer to an end of the first image data.

Example 10 includes the device of any of Examples 1 to 9, and further includes a system-on-chip that includes the entropy encoder, the pixel processor, and on-chip memory, the on-chip memory including the ring buffer.

Example 11 includes the device of any of Examples 1 to 10, further includes a second ring buffer; a second pixel processor coupled to the second ring buffer and configured to retrieve, from the second ring buffer, third image data of a third image frame of a second sequence of image frames; and process the third image data to generate the third image frame; and an entropy decoder coupled to the second ring buffer and configured to decode second bitstream data to generate fourth image data of a fourth image frame of the second sequence of image frames; and store the fourth image data in the second ring buffer.

Example 12 includes the device of any of Examples 1 to 11, and further includes a camera configured to generate the sequence of image frames.

According to Example 13, a method includes retrieving, by an entropy encoder and from a ring buffer, first image data of a first image frame of a sequence of image frames; encoding, at the entropy encoder, the first image data to generate first bitstream data; processing, at a pixel processor, a second image frame of the sequence of image frames to generate second image data; and storing, by the pixel processor, the second image data in the ring buffer.

Example 14 includes the method of Example 13, further comprising storing, by the pixel processor, third image data of a third image frame of the sequence of image frames in the ring buffer prior to the entropy encoder retrieving the second image data from the ring buffer.

Example 15 includes the method of Example 13 or Example 14, further comprising adjusting a size allocation of the ring buffer based on a detected condition of the sequence of image frames.

Example 16 includes the method of Example 15, wherein the detected condition is based on a representative size of image data of a set of previously processed frames of the sequence of image frames.

Example 17 includes the method of Example 16, and further includes determining the representative size based on a largest size of image data of the set of previously processed frames.

Example 18 includes the method of Example 16 or Example 17, and further includes determining the representative size based on an average size of image data of the set of previously processed frames.

Example 19 includes the method of any of Examples 15 to 18, and further includes: generating, at a pixel processor, a sequence of sets of image data corresponding to a set of previously processed frames of the sequence of image frames, wherein the sequence of sets of image data includes a first set of image data larger than a threshold, one or more second sets of image data smaller than the threshold, and a third set of image data larger than the threshold; and determining a count of the one or more second sets based on detecting that each of the one or more second sets is smaller than the threshold and that each of the first set of image data and the third set of image data are larger than the threshold, wherein the detected condition is based on the count of the one or more second sets.

Example 20 includes the method of any of Examples 15 to 19, and further includes generating, at the pixel processor, sets of image data smaller than a threshold, the sets of image data corresponding to a set of previously processed frames of the sequence of image frames; and, based on determining that a count of the sets of image data is greater than a frame interval threshold, refraining from increasing the size allocation of the ring buffer.

Example 21 includes the method of any of Examples 13 to 20, and further includes, after the first image data is written to the ring buffer, advancing a write pointer to an end of the first image data.

Example 22 includes the method of any of Examples 13 to 21, wherein a system-on-chip includes the entropy encoder, the pixel processor, and on-chip memory, and wherein the on-chip memory includes the ring buffer.

Example 23 includes the method of any of Examples 13 to 22, further includes retrieving, by a second pixel processor and from a second ring buffer, third image data of a third image frame of a second sequence of image frames; processing, at the second pixel processor, the third image data to generate the third image frame; decoding, at an entropy decoder, second bitstream data to generate fourth image data of a fourth image frame of the second sequence of image frames; and storing, by the entropy decoder, the fourth image data in the second ring buffer.

Example 24 includes the method of any of Examples 13 to 23, and further includes receiving the sequence of image frames from a camera.

According to Example 25, a non-transitory computer readable medium stores instructions that when executed by a processor, cause the processor to: retrieve, from a ring buffer, first image data of a first image frame of a sequence of image frames; encode the first image data at an entropy encoder to generate first bitstream data; process a second image frame of the sequence of image frames at a pixel processor to generate second image data; and store the second image data in the ring buffer.

According to Example 26, an apparatus includes means for retrieving, from a ring buffer, first image data of a first image frame of a sequence of image frames; means for encoding the first image data at an entropy encoder to generate first bitstream data; means for processing a second image frame of the sequence of image frames at a pixel processor to generate second image data; and means for storing the second image data in the ring buffer.

According to Example 27, a device includes: a ring buffer; a pixel processor coupled to the ring buffer and configured to retrieve, from the ring buffer, first image data of a first image frame of a sequence of image frames; and process the first image data to generate the first image frame; and an entropy decoder coupled to the ring buffer and configured to decode bitstream data to generate second image data of a second image frame of the sequence of image frames; and store the second image data in the ring buffer.

According to Example 28, a method includes: retrieving, by a pixel processor and from a ring buffer, first image data of a first image frame of a sequence of image frames; processing, at the pixel processor, the first image data to generate the first image frame; decoding, at an entropy decoder, bitstream data to generate second image data of a second image frame of the sequence of image frames; and storing, by the entropy decoder, the second image data in the ring buffer.

According to Example 29, a non-transitory computer-readable medium stores instructions that, when executed by a processor, cause the processor to: retrieve, from a ring buffer, first image data of a first image frame of a sequence of image frames; process the first image data at a pixel processor to generate the first image frame; decode bitstream data at an entropy decoder to generate second image data of a second image frame of the sequence of image frames; and store the second image data in the ring buffer.

According to Example 30, an apparatus includes means for retrieving, from a ring buffer, first image data of a first image frame of a sequence of image frames; means for processing the first image data at a pixel processor to generate the first image frame; means for decoding bitstream data at an entropy decoder to generate second image data of a second image frame of the sequence of image frames; and means for storing the second image data in the ring buffer.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal.

In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a ring buffer;
   an entropy encoder coupled to the ring buffer and configured to:
      retrieve, from the ring buffer, first image data of a first image frame of a sequence of image frames; and
      encode the first image data to generate first bitstream data;
   a pixel processor coupled to the ring buffer and configured to:
      process a second image frame of the sequence of image frames to generate second image data; and
      store the second image data in the ring buffer; and
   a buffer controller configured to adjust a size allocation of the ring buffer based on a detected condition of the sequence of image frames, wherein the detected condition is based on a representative size of image data of a set of previously processed frames of the sequence of image frames.

2. The device of claim 1, wherein the pixel processor is configured to store third image data of a third image frame of the sequence of image frames in the ring buffer prior to the entropy encoder retrieving the second image data from the ring buffer.

3. The device of claim 1, wherein the buffer controller is configured to determine the representative size based on a largest size of image data of the set of previously processed frames.

4. The device of claim 1, wherein the buffer controller is configured to determine the representative size based on an average size of image data of the set of previously processed frames.

5. The device of claim 1, wherein the pixel processor is configured to generate a sequence of sets of image data corresponding to a second set of previously processed frames of the sequence of image frames, wherein the sequence of sets of image data includes a first set of image data larger than a threshold, one or more second sets of image data smaller than the threshold, and a third set of image data larger than the threshold, wherein the buffer controller is configured to determine a count of the one or more second sets based on detecting that each of the one or more second sets is smaller than the threshold and that each of the first set of image data and the third set of image data are larger than the threshold, and wherein a second detected condition of the sequence of image frames is based on the count of the one or more second sets.

6. The device of claim 1, wherein the pixel processor is configured to generate sets of image data smaller than a threshold, the sets of image data corresponding to a second set of previously processed frames of the sequence of image frames, and wherein the buffer controller is configured to, based on determining that a count of the sets of image data is greater than a frame interval threshold, refrain from increasing the size allocation of the ring buffer.

7. The device of claim 1, wherein the buffer controller is configured to, after the first image data is written to the ring buffer, advance a write pointer to an end of the first image data.

8. The device of claim 1, further comprising a system-on-chip that includes the entropy encoder, the pixel processor, and on-chip memory, the on-chip memory including the ring buffer.

9. The device of claim 1, further comprising:
a second ring buffer;
a second pixel processor coupled to the second ring buffer and configured to:
  retrieve, from the second ring buffer, third image data of a third image frame of a second sequence of image frames; and
  process the third image data to generate the third image frame; and
an entropy decoder coupled to the second ring buffer and configured to:
  decode second bitstream data to generate fourth image data of a fourth image frame of the second sequence of image frames; and
  store the fourth image data in the second ring buffer.

10. The device of claim 1, further comprising a camera configured to generate the sequence of image frames.

11. A method comprising:
retrieving, by an entropy encoder and from a ring buffer, first image data of a first image frame of a sequence of image frames;
encoding, at the entropy encoder, the first image data to generate first bitstream data;
processing, at a pixel processor, a second image frame of the sequence of image frames to generate second image data;
storing, by the pixel processor, the second image data in the ring buffer; and
adjusting a size allocation of the ring buffer based on a detected condition of the sequence of image frames, wherein the detected condition is based on a representative size of image data of a set of previously processed frames of the sequence of image frames.

12. The method of claim 11, further comprising storing, by the pixel processor, third image data of a third image frame of the sequence of image frames in the ring buffer prior to the entropy encoder retrieving the second image data from the ring buffer.

13. The method of claim 11, further comprising determining the representative size based on a largest size of image data of the set of previously processed frames.

14. The method of claim 11, further comprising determining the representative size based on an average size of image data of the set of previously processed frames.

15. The method of claim 11, further comprising:
generating, at a pixel processor, a sequence of sets of image data corresponding to a set of previously processed frames of the sequence of image frames, wherein the sequence of sets of image data includes a first set of image data larger than a threshold, one or more second sets of image data smaller than the threshold, and a third set of image data larger than the threshold; and
determining a count of the one or more second sets based on detecting that each of the one or more second sets is smaller than the threshold and that each of the first set of image data and the third set of image data are larger than the threshold, wherein a second detected condition of the sequence of image frames is based on the count of the one or more second sets.

16. A non-transitory computer readable medium storing instructions that when executed by a processor, cause the processor to:
retrieve, from a ring buffer, first image data of a first image frame of a sequence of image frames;
encode the first image data at an entropy encoder to generate first bitstream data;
process a second image frame of the sequence of image frames at a pixel processor to generate second image data; and
store the second image data in the ring buffer; and
adjust a size allocation of the ring buffer based on a detected condition of the sequence of image frames, wherein the detected condition is based on a representative size of image data of a set of previously processed frames of the sequence of image frames.

17. The method of claim 11, further comprising:
generating sets of image data smaller than a threshold, the sets of image data corresponding to a second set of previously processed frames of the sequence of image frames, and
based on determining that a count of the sets of image data is greater than a frame interval threshold, refraining from increasing the size allocation of the ring buffer.

18. The method of claim 11, further comprising, after writing the first image data to the ring buffer, advancing a write pointer to an end of the first image data.

19. The method of claim 11, wherein the entropy encoder, the pixel processor, and on-chip memory are included in a system-on-chip, the on-chip memory including the ring buffer.

20. The method of claim 11, further comprising:
retrieving, from a second ring buffer, third image data of a third image frame of a second sequence of image frames;
processing the third image data to generate the third image frame;
decoding second bitstream data to generate fourth image data of a fourth image frame of the second sequence of image frames; and
storing the fourth image data in the second ring buffer.

* * * * *